US011329597B2

(12) United States Patent
Vanko et al.

(10) Patent No.: US 11,329,597 B2
(45) Date of Patent: May 10, 2022

(54) REDUCING NOISE AND LOWERING HARMONICS IN POWER TOOLS USING CONDUCTION BAND CONTROL SCHEMES

(71) Applicant: Black & Decker Inc., New Britain, CT (US)

(72) Inventors: John C. Vanko, Timonium, MD (US); Michael K. Forster, White Hall, MD (US); Tal Gottesman, Lutherville, MD (US); John D. Cox, Lutherville, MD (US)

(73) Assignee: Black & Decker Inc., New Britain, CT (US)

(*) Notice: Subject to any disclaimer, the term of this patent is extended or adjusted under 35 U.S.C. 154(b) by 342 days.

(21) Appl. No.: 15/964,916

(22) Filed: Apr. 27, 2018

(65) Prior Publication Data
US 2018/0248507 A1 Aug. 30, 2018

Related U.S. Application Data

(63) Continuation of application No. PCT/US2016/060111, filed on Nov. 2, 2016.
(Continued)

(51) Int. Cl.
H02P 29/50 (2016.01)
B25F 5/00 (2006.01)
(Continued)

(52) U.S. Cl.
CPC ............... H02P 29/50 (2016.02); B25F 5/00 (2013.01); B25F 5/02 (2013.01); H02P 7/2913 (2013.01); H02P 29/40 (2016.02); B25F 5/006 (2013.01)

(58) Field of Classification Search
CPC .......... H02P 29/50; H02P 29/40; H02P 1/028; H02P 9/00; H02P 21/02; H02P 23/02; B25F 5/00
See application file for complete search history.

(56) References Cited

U.S. PATENT DOCUMENTS 658,023 A 9/1900 Shanklin
3,908,130 A 9/1975 Lafuze
(Continued)

FOREIGN PATENT DOCUMENTS

DE 201 10 943 11/2001
DE 100 37 936 1/2002
(Continued)

OTHER PUBLICATIONS

Written Opinion of the International Search Authority dated Feb. 24, 2017 issued in International Application No. PCT/US2016/060111.
(Continued)

Primary Examiner — Said Bouziane
(74) Attorney, Agent, or Firm — Amir R. Rohani

(57) ABSTRACT

Conduction band control schemes are presented for reducing noise and/or lower harmonics in power tools. A controller in the tool is interfaced with a plurality of motor switches and, for each phase, operates to output a pulse-width modulated (PWM) signal to one or more of the motor switches to control power supplied to the electric motor. The controller is also configured to monitor a parameter indicative of the load on the motor. In response to detecting a load greater than a threshold, the controller controls power output of the motor by setting conduction band of the motor switches and the advance angle to baseline values predetermined values. In response to detecting a load less than the threshold, the controller reduces at least one of the conduction band and the advance angle to a value less than the baseline values.

20 Claims, 15 Drawing Sheets

US 11,329,597 B2

Page 2

Related U.S. Application Data

(60) Provisional application No. 62/249,582, filed on Nov. 2, 2015.

(51) Int. Cl.
*H02P 29/40* (2016.01)
*B25F 5/02* (2006.01)
*H02P 7/29* (2016.01)

(56) References Cited

U.S. PATENT DOCUMENTS

| | | | |
|---|---|---|---|
| 3,934,710 | A | 2/1976 | Tanikoshi |
| 3,937,974 | A | 2/1976 | Lafuze |
| 4,005,347 | A | 1/1977 | Erdman |
| 4,015,182 | A | 3/1977 | Erdman |
| 4,169,990 | A | 10/1979 | Lerdman |
| 4,588,936 | A | 5/1986 | Itoh et al. |
| 4,608,527 | A | 8/1986 | Glennon et al. |
| 4,628,233 | A | 12/1986 | Bradus |
| 4,649,245 | A | 3/1987 | Lessig, III et al. |
| 4,707,650 | A | 11/1987 | Bose |
| 4,737,661 | A | 4/1988 | Lessig, III et al. |
| 4,743,815 | A | 5/1988 | Gee et al. |
| 4,835,448 | A | 5/1989 | Dishner et al. |
| 4,847,526 | A | 6/1989 | Takehara et al. |
| 4,879,503 | A | 11/1989 | Aoki et al. |
| RE33,379 | E | 10/1990 | Bradus |
| 5,038,084 | A | 8/1991 | Wing |
| 5,107,151 | A | 4/1992 | Cambier |
| 5,168,202 | A | 12/1992 | Bradshaw et al. |
| 5,229,693 | A | 7/1993 | Futami et al. |
| 5,298,839 | A | 3/1994 | Takeda |
| 5,440,215 | A | 8/1995 | Gilmore |
| 5,563,482 | A | 10/1996 | Shaw et al. |
| 5,583,411 | A | 12/1996 | Kusano et al. |
| 5,677,605 | A | 10/1997 | Cambier et al. |
| 5,739,651 | A | 4/1998 | Miyazawa et al. |
| 5,804,939 | A | 9/1998 | Yamai et al. |
| 5,821,722 | A | 10/1998 | Forbes et al. |
| 5,901,269 | A | 5/1999 | Chang |
| 5,982,122 | A | 11/1999 | Hollenbeck et al. |
| 6,034,494 | A | 3/2000 | Kitamine et al. |
| 6,060,859 | A | 5/2000 | Jonokuchi |
| 6,081,087 | A | 6/2000 | Iijima et al. |
| 6,198,240 | B1 | 3/2001 | Notohara et al. |
| 6,222,333 | B1 | 4/2001 | Garnett et al. |
| 6,236,179 | B1 | 5/2001 | Lawler et al. |
| 6,326,748 | B1 * | 12/2001 | Moroto ............. F02M 37/048 318/400.3 |
| 6,400,107 | B1 | 6/2002 | Nakatani et al. |
| 6,400,108 | B1 | 6/2002 | Chen et al. |
| 6,424,798 | B1 | 7/2002 | Kitamine |
| 6,518,719 | B1 | 2/2003 | Suzuki et al. |
| 6,536,536 | B1 | 3/2003 | Gass et al. |
| 6,545,442 | B2 | 4/2003 | Sunaga et al. |
| 6,577,097 | B2 | 6/2003 | Krefta et al. |
| 6,580,235 | B2 | 6/2003 | Laurent |
| 6,605,912 | B1 | 8/2003 | Bharadwaj et al. |
| 6,626,002 | B1 | 9/2003 | Notohara et al. |
| 6,650,073 | B2 | 11/2003 | Kawabata |
| 6,671,459 | B1 | 12/2003 | Bultman |
| 6,696,814 | B2 | 2/2004 | Henderson et al. |
| 6,790,134 | B2 | 9/2004 | Swaddle et al. |
| 6,803,739 | B2 | 10/2004 | Miyata et al. |
| 6,879,129 | B2 | 4/2005 | Tazawa et al. |
| 6,949,006 | B1 | 9/2005 | Chen et al. |
| 6,995,679 | B2 | 2/2006 | Eskritt et al. |
| 7,007,762 | B2 | 3/2006 | Yamamoto |
| 7,102,306 | B2 | 9/2006 | Hamaoka et al. |
| 7,157,870 | B2 | 1/2007 | Nakagawa et al. |
| 7,170,243 | B2 | 1/2007 | Nakagawa et al. |
| 7,180,256 | B2 | 2/2007 | Eskritt et al. |
| 7,193,385 | B2 | 3/2007 | Emadi et al. |
| 7,202,622 | B2 | 4/2007 | Eskritt et al. |
| 7,205,738 | B2 | 4/2007 | Chapman et al. |
| 7,208,895 | B2 | 4/2007 | Marcinkiewicz et al. |
| 7,235,940 | B2 | 6/2007 | Bosch et al. |
| 7,292,009 | B2 | 11/2007 | Kawakami et al. |
| 7,334,648 | B2 | 2/2008 | Arimura |
| 7,375,485 | B2 | 5/2008 | Shahi et al. |
| 7,385,366 | B2 | 6/2008 | Yukitake |
| 7,436,139 | B2 | 10/2008 | Maslov et al. |
| 7,551,411 | B2 | 6/2009 | Woods et al. |
| 7,560,893 | B2 | 7/2009 | Thomson |
| 7,612,520 | B2 | 11/2009 | Cryan et al. |
| 7,643,733 | B2 | 1/2010 | El-Antably et al. |
| 7,667,423 | B2 | 2/2010 | Shahi et al. |
| 7,750,594 | B2 | 7/2010 | Clothier et al. |
| 7,755,308 | B2 | 7/2010 | Kayikci et al. |
| 7,821,217 | B2 | 10/2010 | Abolhassan et al. |
| 7,893,638 | B2 | 2/2011 | Akama et al. |
| 7,960,931 | B2 | 6/2011 | Rodriguez et al. |
| 8,040,090 | B2 | 10/2011 | Kitagawa |
| 8,212,504 | B2 | 7/2012 | Ogahara |
| 8,226,372 | B2 | 7/2012 | Hamaoka et al. |
| 8,313,012 | B2 | 11/2012 | Shima et al. |
| 8,395,337 | B2 | 3/2013 | Onishi et al. |
| 8,403,072 | B2 | 3/2013 | Eshleman et al. |
| 8,418,778 | B2 | 4/2013 | Eshleman et al. |
| 8,432,123 | B2 | 4/2013 | Hofmann |
| 8,450,988 | B2 | 5/2013 | Kung |
| 8,476,853 | B2 | 7/2013 | Vanko et al. |
| 8,487,564 | B2 | 7/2013 | Kitagawa et al. |
| 8,564,236 | B2 | 10/2013 | Hirabayashi et al. |
| 8,587,230 | B2 | 11/2013 | Pant et al. |
| 8,610,386 | B2 | 12/2013 | Asukai |
| 8,616,299 | B2 | 12/2013 | Ichikawa |
| 8,643,319 | B2 | 2/2014 | Celik |
| 8,686,675 | B2 | 4/2014 | Kawano et al. |
| 8,689,900 | B2 | 4/2014 | Miwa et al. |
| 8,798,004 | B2 | 8/2014 | Skinner |
| 8,800,679 | B2 | 8/2014 | Eshleman et al. |
| 8,800,680 | B2 | 8/2014 | Eshleman et al. |
| 8,847,532 | B2 | 9/2014 | Miyazaki et al. |
| 8,931,576 | B2 | 1/2015 | Iwata |
| 8,941,349 | B2 | 1/2015 | Inoue |
| 9,018,872 | B2 | 1/2015 | Inoue et al. |
| 9,106,164 | B2 | 8/2015 | Seki et al. |
| 9,114,519 | B2 | 8/2015 | Iwata et al. |
| 9,154,062 | B2 | 10/2015 | Yanagihara et al. |
| 9,197,146 | B2 | 11/2015 | Mergener et al. |
| 9,225,273 | B2 | 12/2015 | Sato |
| 9,240,747 | B2 | 1/2016 | Vanko |
| 9,240,749 | B2 | 1/2016 | Green et al. |
| 9,276,509 | B2 | 3/2016 | Kato et al. |
| 2001/0043806 | A1 | 11/2001 | Gorti et al. |
| 2003/0121685 | A1 | 7/2003 | Yamamoto |
| 2004/0017119 | A1 | 1/2004 | Yamamoto et al. |
| 2005/0225275 | A1 * | 10/2005 | Eskritt ............... B62D 5/065 318/437 |
| 2006/0038537 | A1 | 2/2006 | Heigl |
| 2006/0261766 | A1 | 11/2006 | Nakagawa et al. |
| 2007/0152624 | A1 * | 7/2007 | Hamaoka ............... H02P 6/182 318/805 |
| 2007/0267990 | A1 | 11/2007 | Abolhassan et al. |
| 2008/0265695 | A1 | 10/2008 | Yoshida et al. |
| 2009/0160373 | A1 | 6/2009 | Katou et al. |
| 2009/0295313 | A1 | 12/2009 | Suzuki et al. |
| 2010/0251510 | A1 | 10/2010 | Clothier et al. |
| 2010/0253264 | A1 | 10/2010 | Clothier et al. |
| 2010/0253265 | A1 | 10/2010 | Clothier et al. |
| 2010/0283416 | A1 * | 11/2010 | Onishi ............... H02P 6/28 318/400.09 |
| 2010/0307782 | A1 | 12/2010 | Iwata et al. |
| 2011/0000688 | A1 | 1/2011 | Iwata |
| 2011/0037423 | A1 | 2/2011 | Koda et al. |
| 2011/0148332 | A1 * | 6/2011 | Kawano ............... B25F 5/00 318/244 |
| 2011/0273117 | A1 | 11/2011 | Nakamura et al. |
| 2011/0279070 | A1 * | 11/2011 | Tanaka ............... H02P 6/181 318/400.1 |
| 2012/0074878 | A1 | 3/2012 | Pant et al. |
| 2012/0191250 | A1 | 7/2012 | Iwata et al. |
| 2012/0247796 | A1 | 10/2012 | Mueller et al. |

(56) References Cited

U.S. PATENT DOCUMENTS

| | | |
|---|---|---|
| 2012/0319626 A1 | 12/2012 | Wichert et al. |
| 2013/0008676 A1 | 1/2013 | Eshleman et al. |
| 2013/0015789 A1 | 1/2013 | Miyazaki et al. |
| 2013/0020102 A1 | 1/2013 | Bjornlinger et al. |
| 2013/0063060 A1* | 3/2013 | Dorner .............. H02P 6/085 |
| | | 318/400.14 |
| 2013/0228353 A1 | 9/2013 | Chen et al. |
| 2013/0314007 A1* | 11/2013 | Yanagihara ........... H02P 6/28 |
| | | 318/139 |
| 2014/0084823 A1 | 3/2014 | Lee |
| 2014/0174824 A1 | 6/2014 | Schamberger et al. |
| 2014/0210379 A1 | 7/2014 | Kato et al. |
| 2014/0352995 A1* | 12/2014 | Matsunaga ............ B25F 5/00 |
| | | 173/179 |
| 2015/0034349 A1 | 2/2015 | Proudlock |
| 2015/0042246 A1 | 2/2015 | Tadokoro et al. |
| 2015/0222212 A1 | 8/2015 | Iwata |
| 2015/0290784 A1 | 10/2015 | Andres et al. |
| 2015/0352699 A1 | 12/2015 | Sakai et al. |
| 2016/0043620 A1 | 2/2016 | Li et al. |
| 2016/0049890 A1 | 2/2016 | Mergener et al. |
| 2016/0211791 A1 | 7/2016 | Green et al. |

FOREIGN PATENT DOCUMENTS

| | | |
|---|---|---|
| DE | 10037936 | 1/2002 |
| EP | 2 127 824 | 12/2009 |
| EP | 1 738 877 | 9/2011 |
| EP | 2 433 757 | 3/2012 |
| EP | 2433757 | 3/2012 |
| EP | 2 329 922 | 4/2013 |
| EP | 2 391 483 | 6/2013 |
| EP | 2 674 256 | 12/2013 |
| EP | 2 674 261 | 12/2013 |
| EP | 2674256 | 12/2013 |
| EP | 2674261 | 12/2013 |
| EP | 2 656 485 | 5/2015 |
| EP | 2 623 267 | 8/2015 |
| JP | 04-183253 | 6/1992 |
| JP | 07-337067 | 12/1995 |
| JP | 09-247976 | 9/1997 |
| JP | 2000-069788 | 3/2000 |
| JP | 2000-334625 | 12/2000 |
| JP | 2000-354392 | 12/2000 |
| JP | 2002-315381 | 10/2002 |
| JP | 2001-238482 | 8/2004 |
| JP | 2005-001039 | 1/2005 |
| JP | 2005-169535 | 6/2005 |
| JP | 2005-176458 | 6/2005 |
| JP | 2009-131934 | 6/2009 |
| JP | 2010-041741 | 2/2010 |
| JP | 2010-064544 | 3/2010 |
| JP | 2010-98922 | 4/2010 |
| JP | 2010-173054 | 8/2010 |
| JP | 2010-178488 | 8/2010 |
| JP | 2011-011313 | 1/2011 |
| JP | 2012-066334 | 4/2012 |
| JP | 2012-071407 | 4/2012 |
| JP | 2013-022665 | 2/2013 |
| WO | 2005/025050 | 3/2005 |
| WO | 2009/075071 | 6/2009 |
| WO | 2009075071 | 6/2009 |
| WO | 2015/025750 | 2/2015 |
| WO | 2015025750 | 2/2015 |

OTHER PUBLICATIONS

International Search Reported dated Feb. 24, 2017 issued in International Application No. PCT/US2016/060111.

* cited by examiner

REDUCING NOISE AND LOWERING HARMONICS IN POWER TOOLS USING CONDUCTION BAND CONTROL SCHEMES

CROSS-REFERENCE TO RELATED APPLICATIONS

This application is a continuation of PCT Application No. PCT/US2016/060111, filed Nov. 2, 2016, published as International Publication No. WO/2017/079295, which claims the benefit of U.S. Provisional Application No. 62/249,582, filed on Nov. 2, 2015. The entire disclosure of the above application is incorporated herein by reference.

FIELD

The present disclosure relates to reducing noise and/or lowering harmonics in power tools through the use of conduction band control schemes.

BACKGROUND

Power tools may be of different types depending on the type of output provided by the power tool. For example, a power tool may be a drill, hammer, grinder, impact wrench, circular saw, reciprocating saw, and so on. Some power tools may be powered by an alternating current (AC) power source while others may be portable and may be powered by a direct current (DC) power source such as a battery pack. Against this backdrop, different motor control schemes are needed to ensure proper motor speed is achieved and sufficient power is delivered to the motor. Likewise, there is a need for motor control schemes that reduce motor noise and/or lower harmonics in certain power tool applications.

This section provides background information related to the present disclosure which is not necessarily prior art.

SUMMARY

This section provides a general summary of the disclosure, and is not a comprehensive disclosure of its full scope or all of its features.

A power tool may include: a brushless direct current (BLDC) motor having a stator defining a plurality of phases (e.g., three); a switching arrangement having a plurality of motor switches connected electrically between a power source and the BLDC motor; and a controller interfaced with the plurality of motor switches. For each phase, the controller operates to output a pulse-width modulated (PWM) signal to one or more of the plurality of motor switches to control power supplied to the BLDC motor.

The controller is further configured to monitor a parameter indicative of load on the BLDC motor. In response to detecting a load greater than a threshold, the controller controls power output of the BLDC motor by setting conduction band of the plurality of motor switches and advance angle at predetermined values (e.g., 120 degrees and 30 degrees, respectively). In response to detecting a load less than the threshold, the controller reduces at least one of the conduction band and the advance angle to a value less than the predetermined values.

In one aspect, the controller operates to reduce noise during low load condition. For example, in response to detecting a load less than the threshold, the controller sets the value of the advance angle to zero.

In another example, in response to detecting a load less than the threshold, the controller sets the value of the conduction band for each phase to a value less than 120 degrees.

In yet another example, in response to detecting a load less than the threshold, the controller reduces the conduction band and the advance angle to values less than the predetermined values.

In another aspect, the controller operates to lower harmonics during no load conditions. For example, in response to detecting a no load condition, the controller decreases the conduction band for each phase to a value less than the predetermined value while maintaining the duty cycle of the PWM signals at a fixed value (e.g., 100%) to achieve a desired speed. During a no load condition, the controller may also adjust the conduction band during each phase to achieve a constant speed.

In another example, in response to detecting a load, the controller maintains speed of the BDLC motor at a target speed using closed loop control; whereas, in response to detecting a no load condition, the controller maintains speed of the BDLC motor at the target speed using open loop control.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
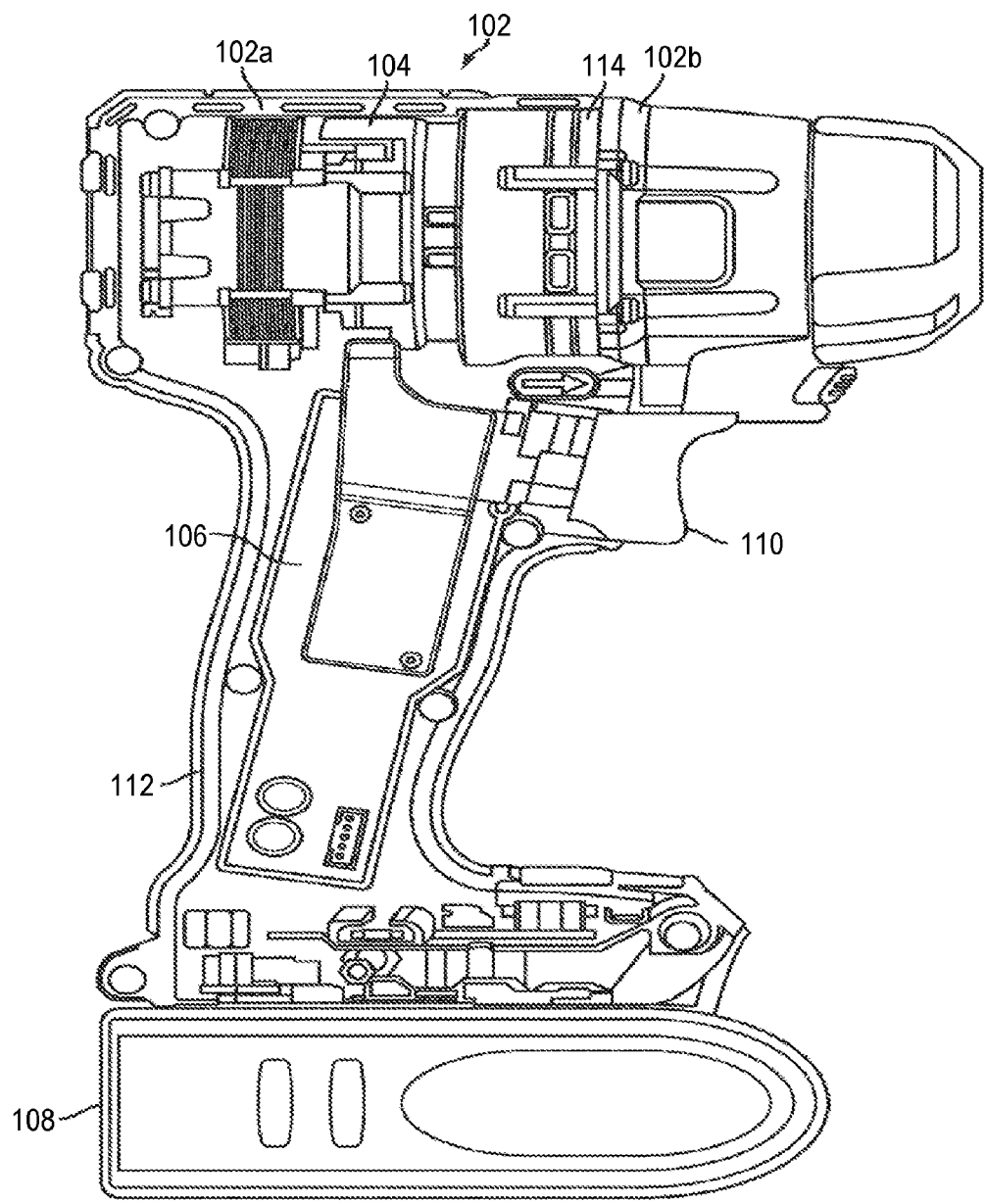
FIG. 1 is a cross-sectional view of an example power tool.

With reference to the FIG. 1, a power tool 100 constructed in accordance with the teachings of the present disclosure is illustrated in a longitudinal cross-section view. The power tool 100 in the particular example provided may be a drill or impact driver, but it will be appreciated that the teachings of this disclosure is merely exemplary and the power tool of this invention could be a hammer, grinder, impact wrench, circular saw, reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a tool housing 102, a motor assembly 104, a control module 106, an input unit (e.g., a variable speed trigger) 110, a transmission assembly 114, an output spindle, and a chuck that can be coupled for rotation with the output spindle.

According to an embodiment, the motor 104 is received in the housing 102. The motor can be any type of motor and may be powered by an appropriate power source (electricity, pneumatic power, hydraulic power). In the particular example provided, the motor is a brushless DC electric motor and is powered by a battery pack 108. An input unit 110 is mounted in the handle 112 of the housing 102. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110, supplies the drive signals to the motor. In the exemplary embodiment of the invention, the control unit 106 is provided in the handle 112.

Construction details of the brushless motor 104 or the control unit 106 are beyond the scope of this disclosure, and can be found in co-pending International Patent Publication No. WO2011159674 by the same assignee as this application, which is incorporated herein by reference in its entirety.

The brushless motor 104 depicted in FIG. 1 is commutated electronically by the control unit 106. The control unit 106 may include, for example, a programmable micro-controller, micro-processor, or other programmable module or a non-programmable brushless control integrated circuit, configured to control supply of DC power to the motor 104 and accordingly commutate the motor 104. Alternatively, the control unit 106 may include an application-specific integrated circuit (ASIC) configured to execute commutation of the motor 104. The tool 100 is powered by a suitable power source such as the battery pack 108. It is envisioned, however, that aspects of the present disclosures can be applied to a power tool with an AC power source, which in some embodiments may further include a full-wave or half-wave rectifier to power to motor. Using the variable-speed input and other inputs from the input unit 110, the control unit 106 controls the amount of power supplied to the motor 104. In an exemplary embodiment, the control unit 106 controls the pulse width modulation (PWM) duty cycle of the DC power supplied to the motor 104.

Figure 2A:
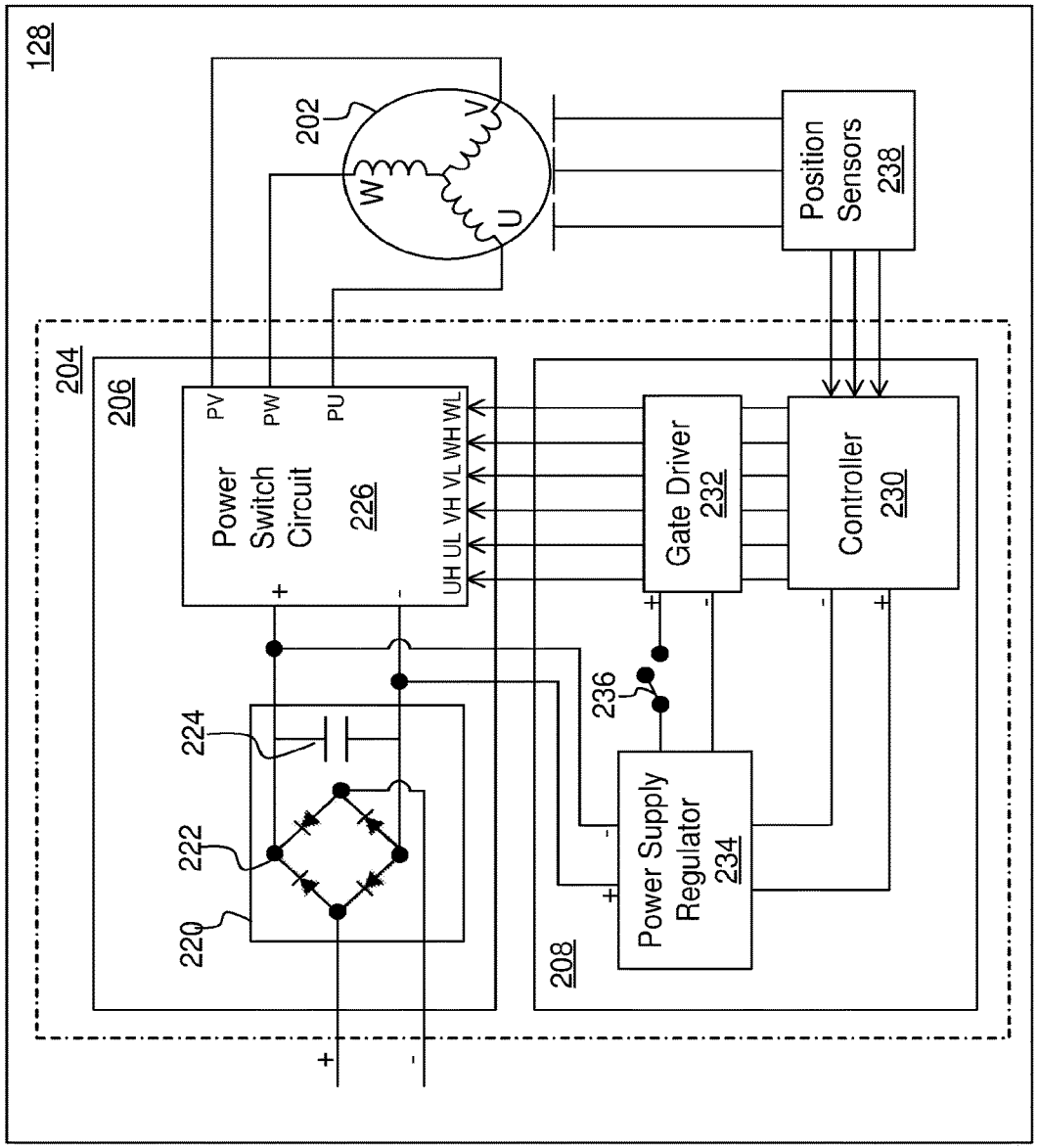
FIG. 2A is a diagram depicting are example motor control system which may be employed by a power tool.
Figure 2B:
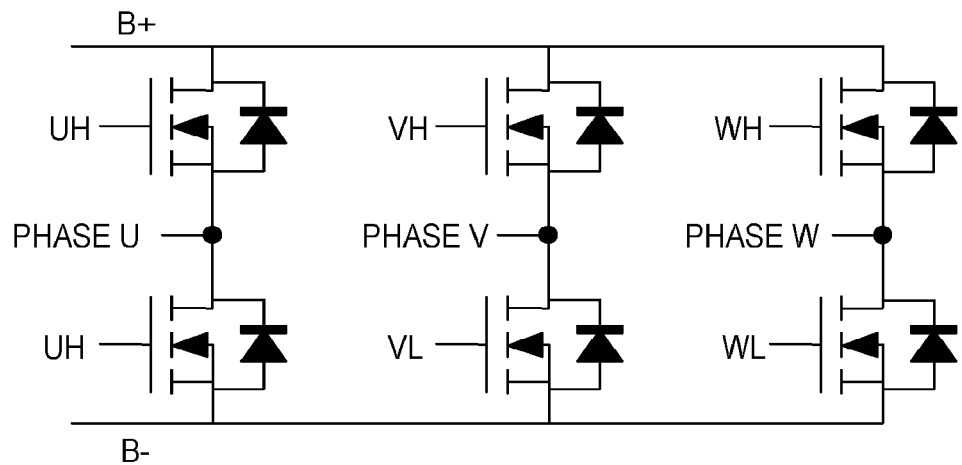
FIG. 2B is a schematic of a three-phase inverter bridge circuit.

Referring to FIGS. 2A and 2B, an example motor control system 128 that may be employed by the power tool 100 is described. In an example embodiment, the motor control system 128 includes a motor control circuit 204 to control supply of power from a power source (e.g., a battery or an AC power supply) to a BLDC motor 202. The motor control circuit 204 further includes a power switch circuit 226 that receives power from the power source and a control unit 208 that controls the supply of power from the power source to a BLDC motor 202 as further discussed below. In the context of an AC power supply, a rectifier 222 along with a capacitor 224 may be interposed between the AC power source and the power switch circuit 226.

In an example embodiment, the power switch circuit 226 may be a three-phase bridge driver circuit including six controllable semiconductor power devices (e.g., FETs, BJTs, IGBTs, etc.). FIG. 2B depicts an exemplary power switch circuit 226 having a three-phase inverter bridge circuit, according to an embodiment. As shown, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL, as discussed below. In an embodiment, the sources of the high-side FETs are coupled to the drains of the low-side FETs to output power signals PU, PV, and PW for driving the BLDC motor 202.

Referring back to FIG. 2A, the control unit 208 includes a controller 230, a gate driver 232, a power supply regulator 234, and a power switch 236. In the example embodiment, the controller 230 is a programmable device arranged to control a switching operation of the power devices in power switching circuit 226. The controller 230 receives rotor rotational position signals from a set of position sensors 238 provided in close proximity to the motor 202 rotor. In one embodiment, the position sensors 238 may be Hall sensors. It should be noted, however, that other types of positional sensors may be alternatively utilized. It should also be noted that controller 230 may be configured to calculate or detect rotational positional information relating to the motor 202 rotor without any positional sensors (in what is known in the art as sensorless brushless motor control). The controller 230 also receives a variable-speed signal from variable-speed actuator (not shown) discussed above. Based on the rotor rotational position signals from the position sensors 238 and the variable-speed signal from the variable-speed actuator, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In the example embodiment, the power supply regulator 234 may include one or more voltage regulators to step down the voltage from the power source to a voltage level compatible for operating the controller 230 and/or the gate driver 232. In one embodiment, power supply regulator 234 may include a buck converter and/or a linear regulator to reduce the voltage of the power source to, for example, 15V for powering the gate driver 232, and down to, for example, 3.2V for powering the controller 230.

In the example embodiment, a power switch 236 may be provided between the power supply regulator 234 and the gate driver 232. The power switch 236 may be an ON/OFF switch coupled to the ON/OFF trigger or the variable-speed actuator to allow the user to begin operating the motor 202, as discussed above. The power switch 236 in this embodiment disables supply of power to the motor 202 by cutting power to the gate drivers 232. It is noted, however, that the power switch 236 may be provided at a different location, for example, between the power source and the power switch circuit 226. It is further noted that in an embodiment, the power tool 100 may be provided without an ON/OFF switch 236, and the controller 230 may be configured to activate the power devices in the power switch circuit 226 when the ON/OFF trigger (or variable-speed actuator) is actuated by the user.

Figure 3A:
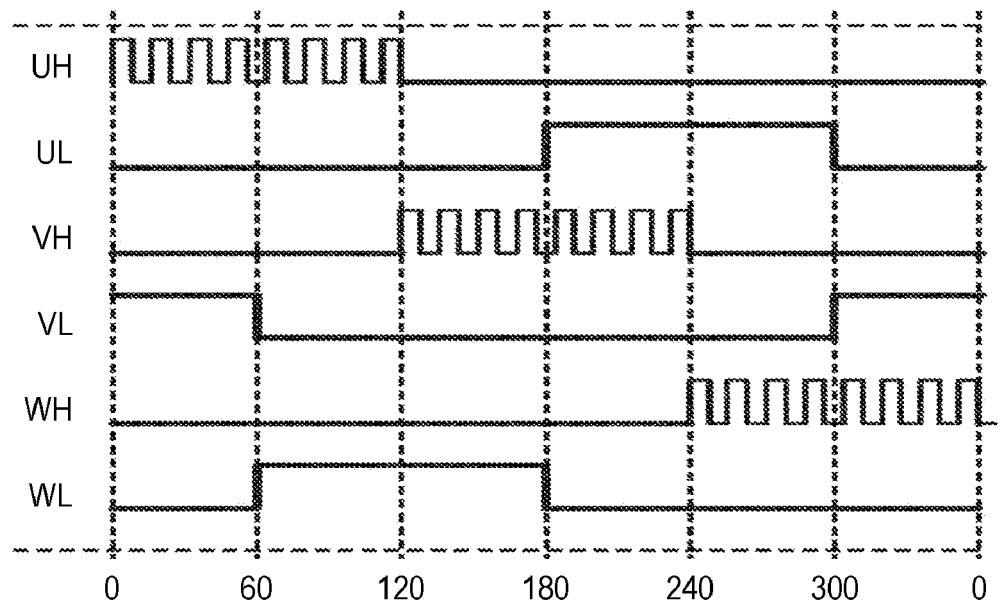
FIG. 3A is a diagram depicting an example waveform of the PWM drive sequence.

FIG. 3A depicts an exemplary waveform diagram of a pulse-width modulation (PWM) drive sequence of the three-phase inverter bridge circuit (FIG. 2C) within a full 360 degree conduction cycle. As shown in this figure, within a full 360° cycle, each of the drive signals associated with the high-side and low-side power switches is activated during a 120° conduction band ("CB"). In this manner, each associated phase of the BLDC 202 motor is energized within a 120° CB by a pulse-width modulated voltage waveform that is controlled by the control unit 208 as a function of the desired motor rotational speed. For each phase, UH is pulse-width modulated by the control unit 208 within a 120° CB. During the CB of the high-side switch, the corresponding UL is kept low. The UL signal is then activated for a full 120° CB within a half cycle (180°) after the CB associated with the UL signal. The control unit 208 controls the amount of voltage provided to the motor, and thus the speed of the motor, via PWM control of the high-side switches.

It is noted that while the waveform diagram of FIG. 3A depicts one exemplary PWM technique at 120° CB, other PWM methods may also be utilized. One such example is PWM control with synchronous rectification, in which the high-side and low-side switch drive signals (e.g., UH and UL) of each phase are PWM-controlled with synchronous rectification within the same 120° CB.

Figure 3B:
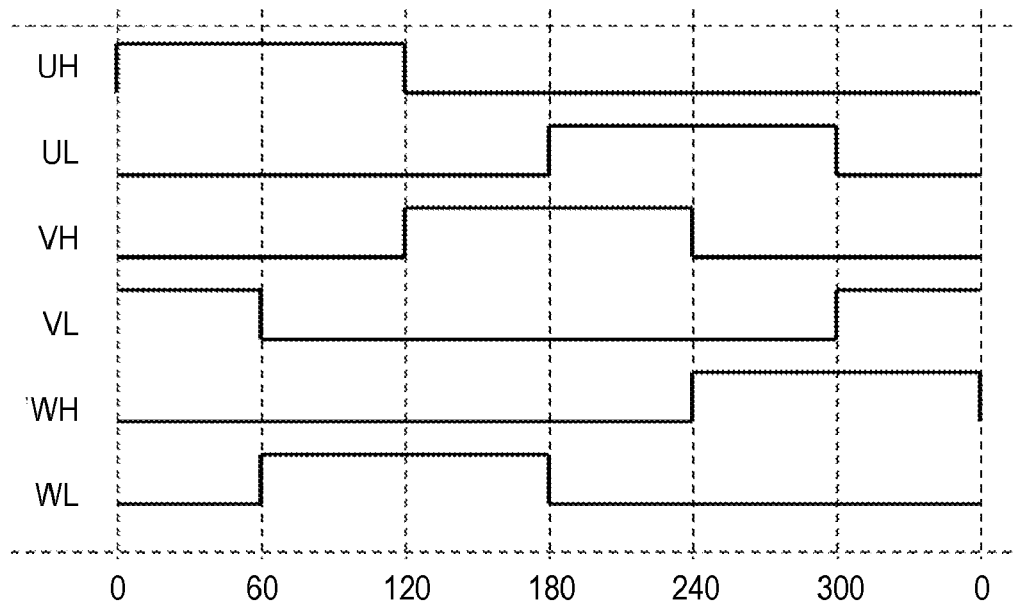
FIG. 3B is a diagram depicting an example waveform of the PWM drive sequence operating at full speed.

FIG. 3B depicts an exemplary waveform diagram of the drive sequence of the three-phase inventor bridge discussed above operating at full-speed (i.e., maximum speed under constant-load condition). In this figure, the three high-side switches conduct at 100% PWM duty cycle during their respective 120° CBs, providing maximum power to the motor to operate at full-speed.

In a BLDC motor, due to imperfections in the commutation of the power switches and the inductance of the motor itself, current will slightly lag behind the back-EMF of the motor. This causes inefficiencies in the motor torque output. Therefore, in practice, the phase of the motor is shifted by an advance angle ("AA") of several degrees so the current supplied to the motor no longer lags the back-EMF of the motor. AA refers to a shifted angle $\gamma$ of the applied phase voltage leading ahead a rotational EMF of the corresponding phase.

In addition, in some embodiments, the motor 202 may be an interior-permanent magnet (IPM) motor or other salient magnet motor. Salient magnet motors can be more efficient than surface-mount permanent magnet motors. Specifically, in addition to the magnet torque, a salient magnet motor includes a reluctance torque that varies as a function of the motor current (specifically, as a function of the square of the motor current), and therefore lags behind the magnet torque. In order to take advantage of this reluctance torque, the AA shifted angle $\gamma$ is increased to encompass the lag of the reluctance torque. The added reluctance torque enables the salient magnet motor to produce 15 percent or more torque per amp than it would without the further shift in angle $\gamma$.

In some embodiments, AA may be implemented in hardware, where positional sensors are physically shifted at an angle with respect to the phase of the motor. Alternatively or additionally, AA may be implanted in software, where the controller 230 is configured to advance the conduction band of each phase of the motor by the angle $\gamma$, as discussed herein.

Figure 3C:
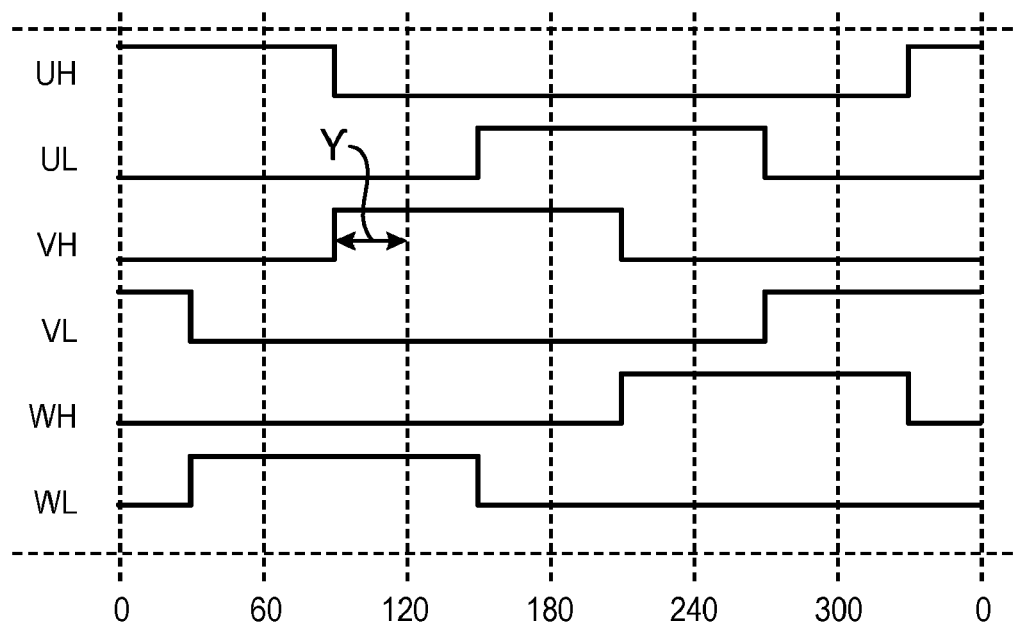
FIG. 3C is a diagram depicting an example waveform of the PWM drive sequence with an angle advance of thirty degrees.

FIG. 3C depicts the waveform diagram of the drive sequence of FIG. 3B, shown with an AA of $\gamma=30°$, according to an embodiment. In this embodiment, AA of 30 degrees is sufficient (and is commonly used by those skilled in the art) in BLDC applications to account for the current lag with respect to the back-EMF of the motor and take advantage of the reluctance torque of salient magnet motors.

Figure 3D:
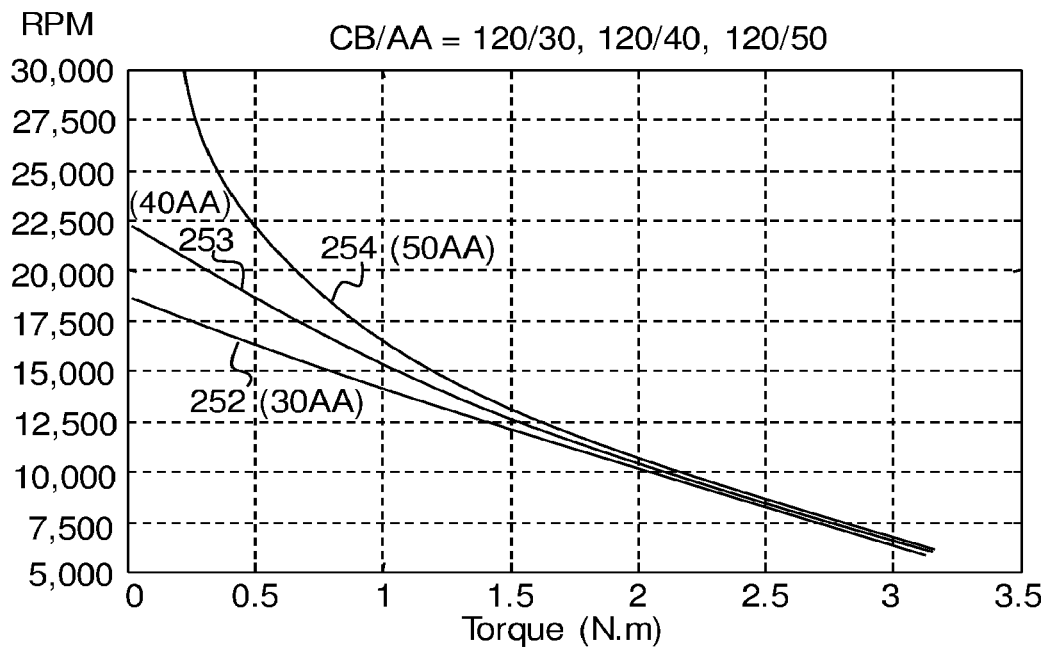
FIG. 3D is a diagram depicting an example speed/torque waveform at different CB/AA settings.

According to one embodiment, increasing the AA to a value greater than $\gamma=30°$ can result in increased motor speed performance. FIG. 3D depicts a speed/torque waveform diagram of an exemplary power tool 100, where increasing the AA at a fixed CB of 120° results in an upward shift in the speed/torque profile, i.e., from 252 ($\gamma=30°$), to 253 ($\gamma=40°$), to 254 ($\gamma=50°$). This shift is particularly significant at a low torque range (e.g., 0 to 1 N.m.), where motor speed can increase by approximately 20% from 252 to 253, and even more from 253 to 254 (particularly at very low torque range of, e.g., 0.2 N.m. where the speed can more than double). At a medium torque range (e.g., 1 to 2 N.m.), the increase in motor speed is noticeable, but not significant. At a high torque range (e.g., 2 N.m. and above), the increase in motor speed is minimal.

Figure 3E:
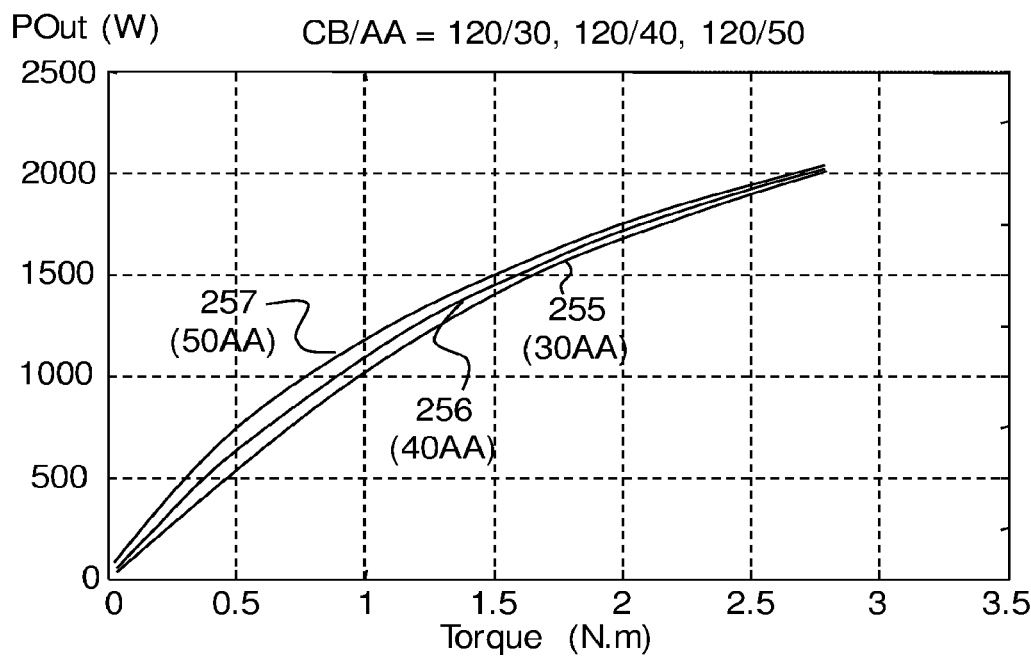
FIG. 3E is a diagram depicting an example power/torque waveform at different CB/AA settings.

Similarly, increasing the AA to a value greater than $\gamma=30°$ can result in increased power output. FIG. 3E depicts a power-out/torque waveform diagram of exemplary tool 128, where increasing the AA at fixed CB of 120° results in an upward shift in the power-out/torque profile, i.e., from 255 (AA=30°), to 256 (AA=40°), to 257 (AA=50°). This shift is somewhat significant at the low and medium torque range of, for example, up to 20% at approximately 1 N.m., but does not have a considerable effect on power output at the high torque range.

While not depicted in these figures, it should be understood that within the scope of this disclosure and consistent with the figures discussed above, power output and speed performance may similarly be reduced if AA is set to a value lower than $\gamma=30°$ (e.g., $\gamma=10°$ or 20°).

Figure 3F:
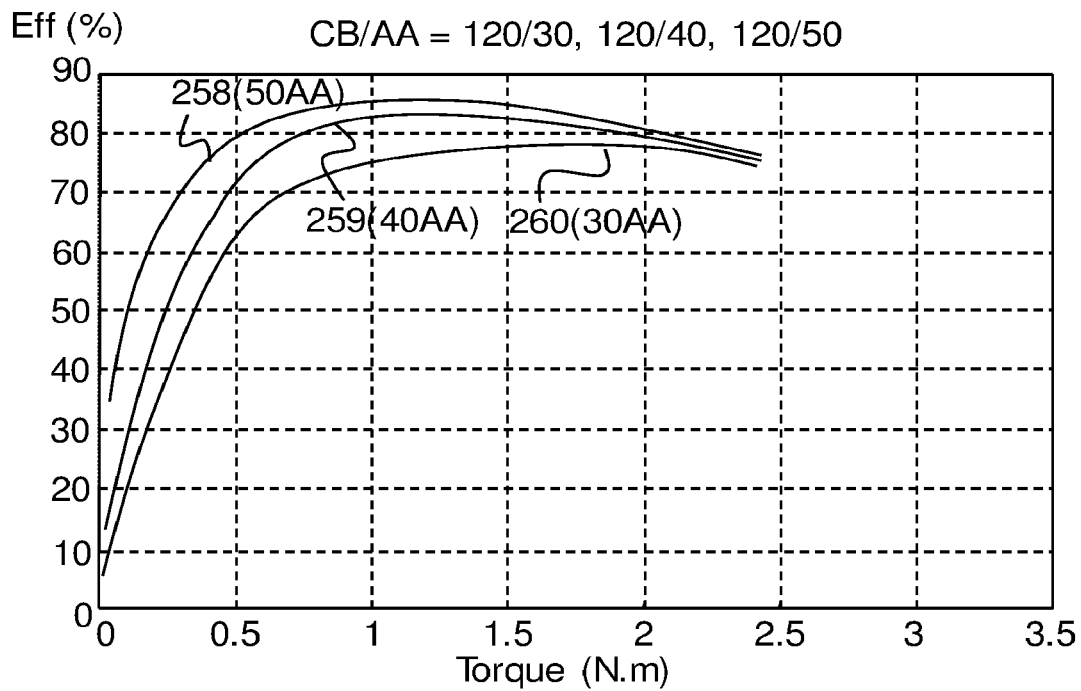
FIG. 3F is a diagram depicting an example efficiency/torque waveform at different CB/AA settings.

While increasing AA to a value greater than $\gamma=30°$ may be used to boost motor speed and power performance, increasing the AA alone at a fixed CB can result in diminished efficiency. As will be understood by those skilled in the art, efficiency is measured as a function of (power-out/powerin). FIG. 3F depicts an exemplary efficiency/torque waveform diagram of tool 100, where increasing the AA at fixed CB of 120° results in a downward shift in the efficiency/torque profile, i.e., from 258 (γ=30°), to 259 (γ=40°), to 265 (γ=50°). This shift is particularly significant at low torque range, where efficiency can decrease by, for example, approximately 20% at around 0.5 N.m., and even more at lower torque. In other words, while increasing the AA alone (at fixed CB) to a value greater than γ=30° can increase speed and power output at low and medium torque ranges, it does so by significantly sacrificing tool efficiency.

Figure 4A:
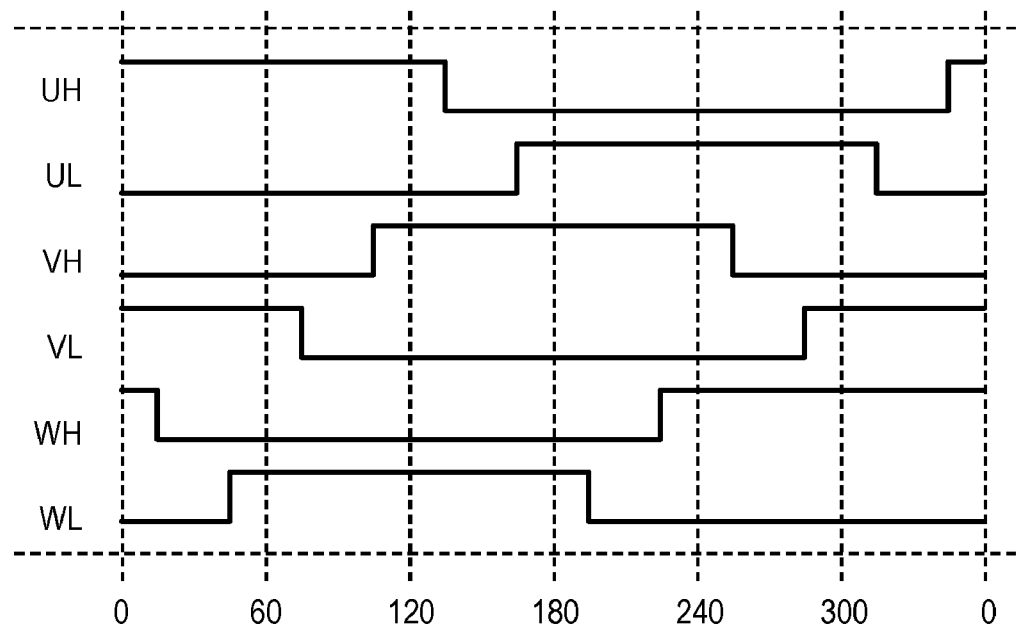
FIG. 4A is a diagram depicting an example waveform of the PWM drive sequence with a conduction band greater than 120 degrees.

Turning to FIG. 4A, a waveform diagram of the drive sequence of the three-phase inventor bridge of the power switch circuit 226 previously discussed is depicted, with a CB value greater than 120°, according to an embodiment of the invention. In an embodiment, the CB of each phase of the brushless motor may be increased from 120°, which is the CB value conventionally used by those skilled in the art, to, for example, 150° as shown in this illustrative example. As compared to a CB of 120° shown in FIG. 3A, the CB may be expanded by 15° on each end to obtain a CB of 150°. Increasing the CB to a value greater than 120° allows three of the switches in the three-phase inventor bridge to be ON simultaneously (e.g., between 45° to 75° and 105° to 135° in the illustrative example) and for voltage to be supplied to each phase of the motor during a larger conduction period. This, in effect, increases the total voltage amount being supplied to the motor 202 from the DC bus line, which consequently increases the motor speed and power output performance, as discussed below.

Figure 4B:
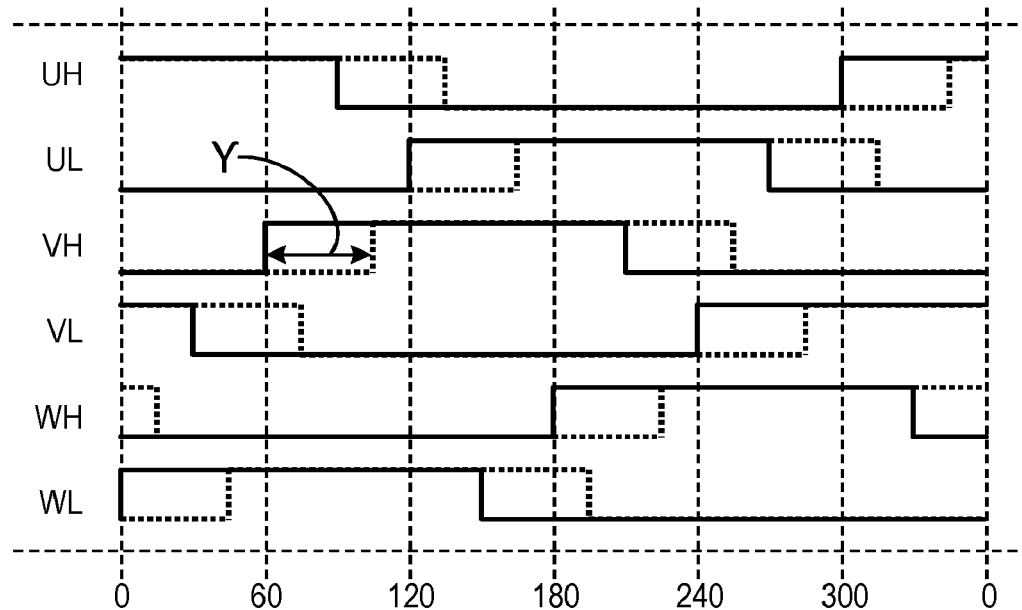
FIG. 4B is a diagram depicting an example waveform of the PWM drive sequence where the angle advance is varied in tandem with the conduction band.

FIG. 4B depicts an embodiment of the invention where the AA of each phase of the brushless motor is also varied in tandem with and corresponding to the CB. In the illustrative example, where the CB is at 150°, the AA is set to an angle of γ=45°. In an embodiment, various CB and AA correlations may be implemented in controller 230 as a look-up table or an equation defining a functional relationship between CB and the associated AA.

An exemplary table showing various CB and associated AA values is as follows:

| CB | AA (γ) |
|---|---|
| 120° | 30° |
| 130° | 35° |
| 140° | 40° |
| 150° | 45° |
| 160° | 50° |
| 170° | 55° |

It is noted that while these exemplary embodiments are made with reference to CB/AA levels of 120°/30°, 140°/40°, 160°/50°, these values are merely exemplary and any CB/AA value (e.g., 162°/50.6°, etc.) may be alternatively used. Also, the correlation between AA and CB provides in this table and throughout this disclosure is merely exemplary and not in any way limiting. Specifically, while the relationship between CB and AA in the table above is linear, the relationship may alternatively be non-linear. Also, the AA values given here for each CB are by no means fixed and can be selected from a range. For example, in an embodiment, CB of 150° may be combined with any AA in the range of 35° to 55°, preferably in the range of 40° to 50°, preferably in the range of 43° to 47°, and CB of 160° may be combined with any AA in the range of 40° to 60°, preferably in the range of 45° to 55°, preferably in the range of 48° to 52°, etc. Moreover, optimal combinations of CB and AA may vary widely from the exemplary values provided in the table above in some power tool applications.

Figure 4C:
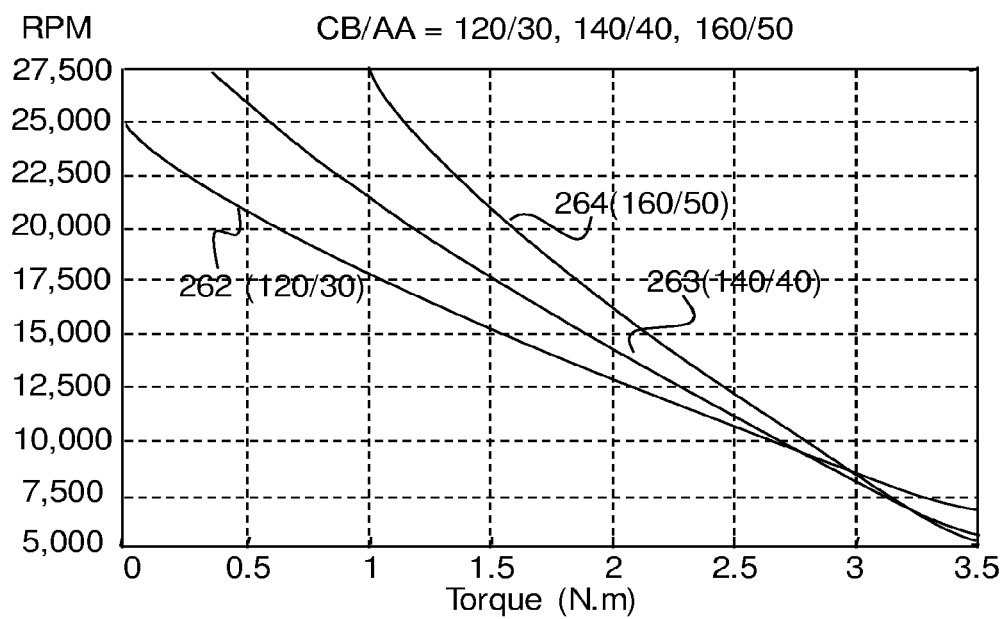
FIG. 4C is a diagram depicting an example speed/torque waveform when increasing angle advance in tandem with the conduction band.
Figure 4D:
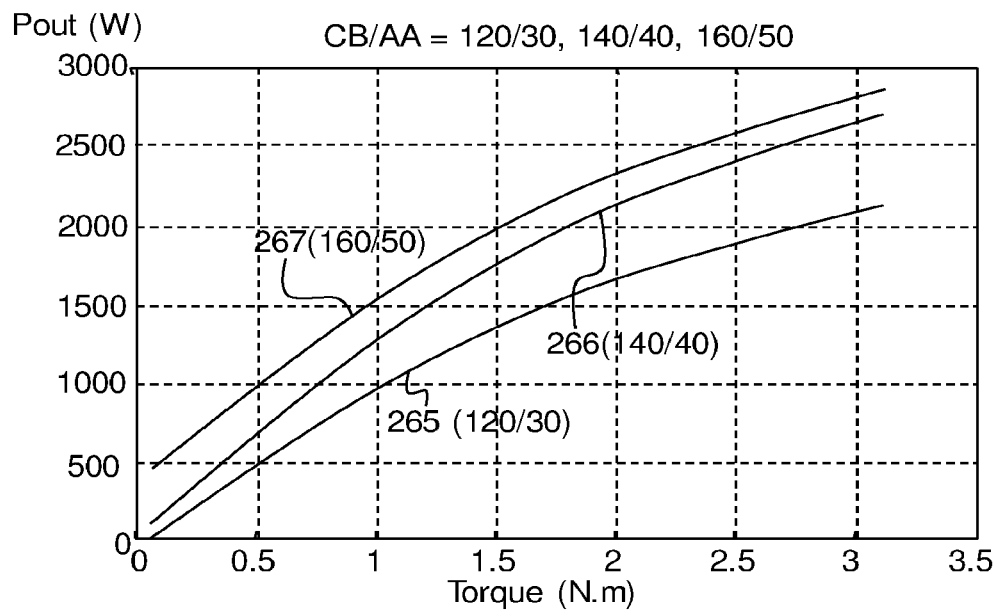
FIG. 4D is a diagram depicting an example power/torque waveform when increasing angle advance in tandem with the conduction band.

Referring now to FIGS. 4C and 4D, increasing the CB and AA in tandem (hereinafter referred to as "CB/AA") as described above to a level greater than the CB/AA of 120°/30° can result in better speed and power output performance over a wider torque range as compared to the waveform diagrams of FIGS. 3D and 3E, according to an embodiment.

As shown in the exemplary speed/torque waveform diagram of FIG. 4C for tool 100, increasing CB/AA results in a significant upward shift in the speed/torque profile, i.e., from 262 (CB/AA=120°/30°), to 263 (CB/AA=140°/40°), to 264 (CB/AA=160°/50°), according to an embodiment. This increase is the greatest at the low torque range (where speed performance can improve by at least approximately 60%), but still significant at the medium torque range (where speed performance can improve by approximately 20% to 60%). It is noted that in an embodiment, the speed/torque profiles 262, 263, 264 begin to converge at a very low speed/very high torque range (e.g., between 7,000 rpm to 10,000 rpm), after which point increasing CB/AA no longer results in better speed performance.

Similarly, as shown in the exemplary power-out/torque waveform diagram of FIG. 4D for tool 100, increasing CB/AA results in a significant upward shift in the power-out/torque profile, i.e., from 265 (CB/AA=120°/30°), to 266 (CB/AA=140°/40°), to 267 (CB/AA=160°/50°), according to an embodiment. In an embodiment, this increase is the greatest from 266 (CB/AA=140°/40°) to 267 (CB/AA=160°/50°) at the low torque range and from 265 (CB/AA=120°/30°) to 266 (CB/AA=140°/40°) at medium and high torque ranges. It is noted that in this figure the increase in CB/AA from 120°/30°) to 160°/50° may yield an increase of up to 50% for some torque conditions, though the motor maximum power output (measured at very high load at max speed) may be increased by 10-30%.

Against this backdrop, different control techniques for power tools are presented in this disclosure which relies at least in part on controlling CB and/or AA. For example, power tools may implement closed-loop speed control. In fixed-speed tools, tool output speed is monitored and if it is lower than the desired speed, the speed is adjusted, for example by increasing or decreasing PWM of motor control signals. Likewise, in variable-speed tools, tool output speed can be monitored and adjusted to achieve a desired speed. In the case of a variable-speed tool, input from the input unit 110 (e.g., trigger displacement) is used to determine the desired speed.

Figure 5:
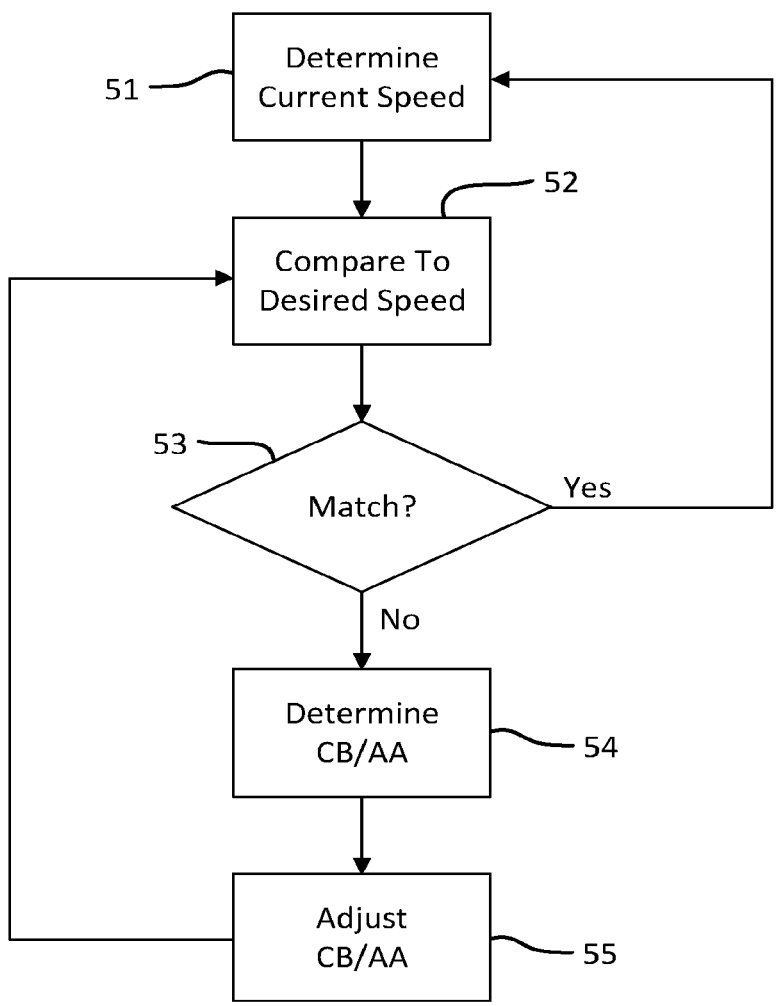
FIG. 5 is a flowchart depicting an example control scheme for implementing closed-loop speed control.

FIG. 5 depicts an example control scheme which may be used to implement closed-loop speed control by the controller 230 in power tool 100. Output speed of the tool (e.g., an output spindle) can be monitored at 51 using various techniques well known in the art. For example, speed may be determined directly using sensors positioned adjacent to the output spindle or inferred from other operating parameters such as current drawn by the motor.

Current speed is then compared at 52 to the desired speed. In the event that the current speed matches (i.e., falls within a predefined tolerance) the desired speed, the tool continues to monitor output speed at 51 and the process is repeated periodically. In the event that the current speed does not match the desired speed (i.e., falls outside the predefined tolerance), the speed of the tool can be adjusted as described below.

In the example embodiment, the speed of the tool is adjusted by increasing or decreasing CB and/or AA.

Depending on the difference between the current speed and the desired speed, an adjustment amount for CB and/or AA is determined as indicated at 54. In one embodiment, the values for AA and/or CB are retrieved from a look-up table based on the difference between the current speed and the desired speed. A portion of an example look-up table is as follows.

| Speed difference (rpm) | AA | CB |
|---|---|---|
| 500 | 30 | 115 |
| 1000 | 30 | 111 |
| 1500 | 30 | 108 |
| 2000 | 30 | 106 |

CB and/or AA are then adjusted at 55 in accordance with the retrieved values and the process is repeated periodically. Unlike conventional approaches, PWM duty cycle is held constant and speed is controlled solely by adjustments to CB and/or AA. One advantage of adjusting speed using CB/AA is to decrease switching losses associated with PWM control.

It is understood that motor performance may be adversely affected if CB is decreased below a certain value (e.g., 90). In the event that the speed difference is such that the CB would be set lower than this certain value, the controller may set the CB to the certain value and adjust the PWM duty cycle to achieve the desired speed reduction. Techniques for determining the adjustment amount other than a look-up table are also contemplated by this disclosure. It is to be understood that only the relevant steps of the control scheme are discussed in relation to FIG. 5, but that other software-implemented instructions may be needed to implement an overall control scheme for the tool.

Controlling CB and/or AA may also be used to implement open loop speed control in another aspect of this disclosure. As discussed above, the power tool 100 of FIG. 1 is a variable-speed power tool powered by a DC battery 108, where the speed of the motor is controlled via input unit 110. The input unit 110 may be a trigger switch, although other variable-speed input units such as speed dials, conductive sensors, etc. may also be utilized.

Figure 6:
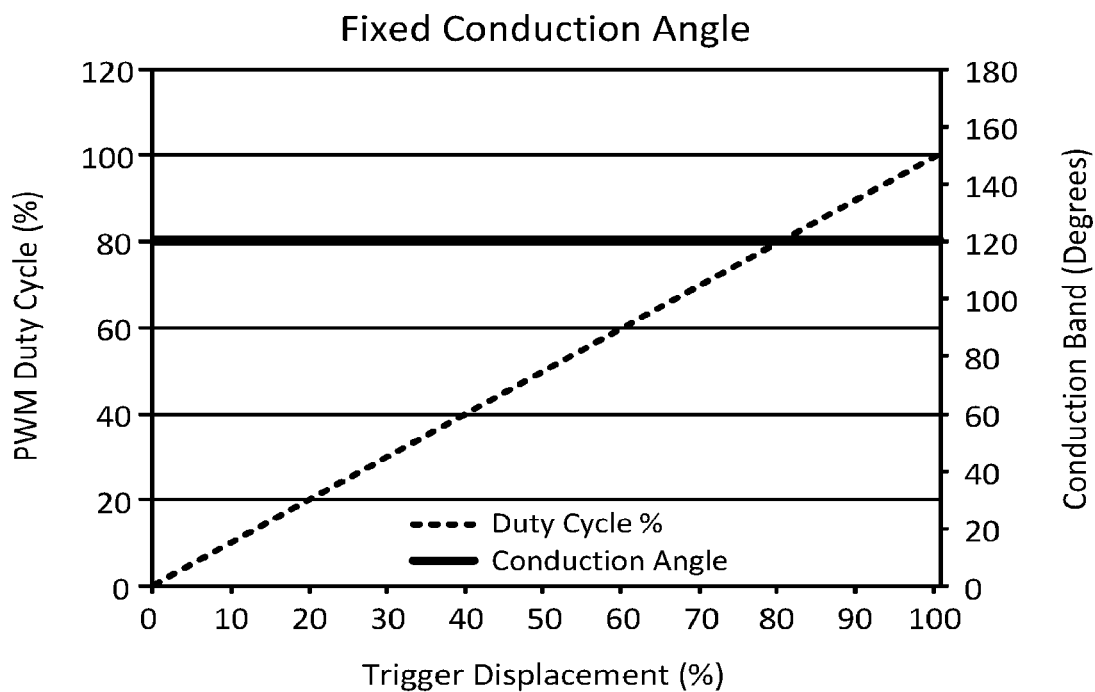
FIG. 6 is a graph depicting a fixed conduction angle in relation to PWM duty cycle in a conventional manner.

FIG. 6 is an exemplary conventional graph depicting the relationship between speed (i.e., PWM duty cycle) vs. trigger displacement (percentage of trigger pull), and conduction band vs. trigger displacement, in a variable-speed DC power tool. As shown herein, conventional power tools are configured such that the motor duty cycle is increased from 0 (no conduction) to 100% (full conduction) as the trigger is engaged by the user from 0% trigger pull to 100% trigger pull. The conduction band of the PWM duty cycle in this conventional method is 120°. The advance angle, while not shown in the graph, may be set to, for example, 30°. The question at hand is how to enhance performance of variable-speed power tools by increasing the conduction band (and optionally advance angle) without compromising the variable-speed functionality.

According to one embodiment, the tool may be operated at a higher conduction band (e.g., CB/AA=160/50°) all the time. In this case, the power tool will provide higher power output throughout the course of trigger displacement. This approach may not be desirable for certain power tool applications, particularly where high trigger resolution is desired at low speed.

According to an alternative embodiment, the tool may be operated with variable conduction band (e.g., CB/AA linearly varying from 120/30 to 160/50) as a function of trigger displacement. The problem with this approach may be that the controller is responsible for increasing PWM and CB/AA simultaneously as the trigger is pulled by the user, which may be too burdensome from a control perspective.

Figure 7:
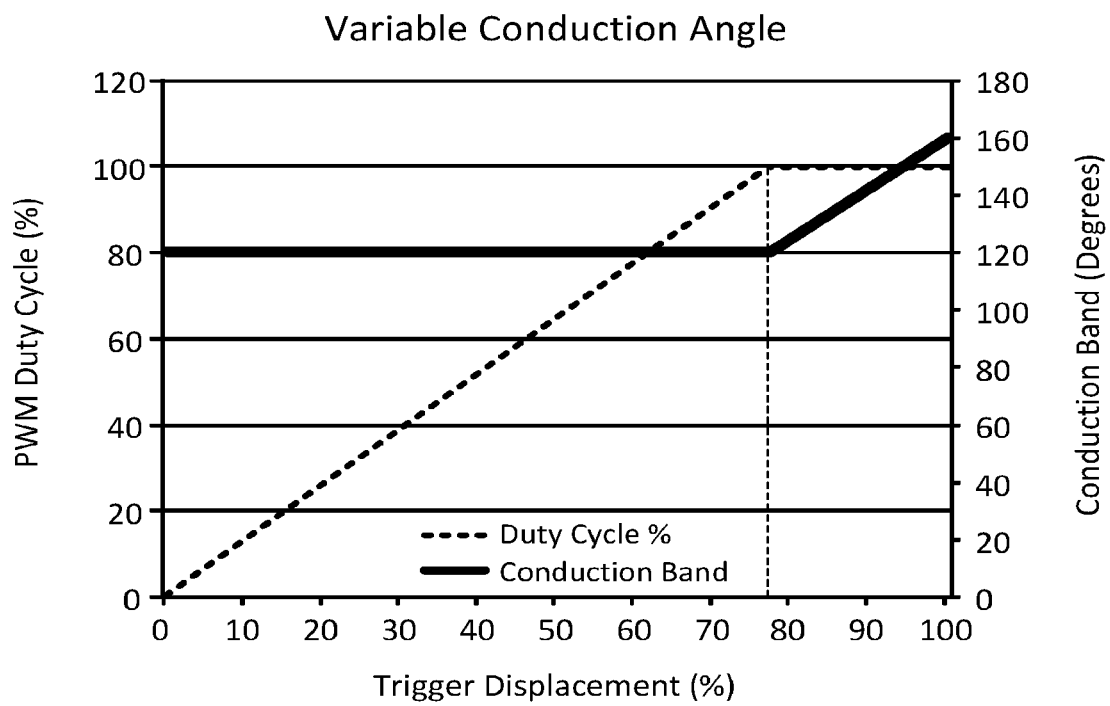
FIG. 7 is a graph depicting a variable conduction angle in relation to PWM duty cycle in an example embodiment.

An alternative embodiment is described herein with reference to the speed vs. trigger displacement and conduction band vs. trigger displacement graph of FIG. 7. In this embodiment, the controller controls the PWM duty cycle of the motor from 0 to 100% within a first range of trigger displacement from zero trigger displacement up to a predetermined transition point (e.g., 78%) of trigger displacement. Throughout this first range of trigger displacement, the conduction band (and optionally advance angle) is kept constant at a first value (e.g., CB/AA=) 120/30°. Thereafter, within a second range of trigger displacement from the predetermined transition point to 100% of trigger displacement, the controller maintains PWM duty cycle at 100% and modifies conduction band (and optionally angle advance) from the first value up to a second value (e.g., from 120/30° to) 160/50°. In one embodiment, the controller is configured to vary the conduction band linearly. In other embodiments, the variation in the conduction band may be nonlinear. In either case, this embodiment allows the controller to increase conduction band for speed control after the PWM duty cycle has reached 100%.

Figure 8:
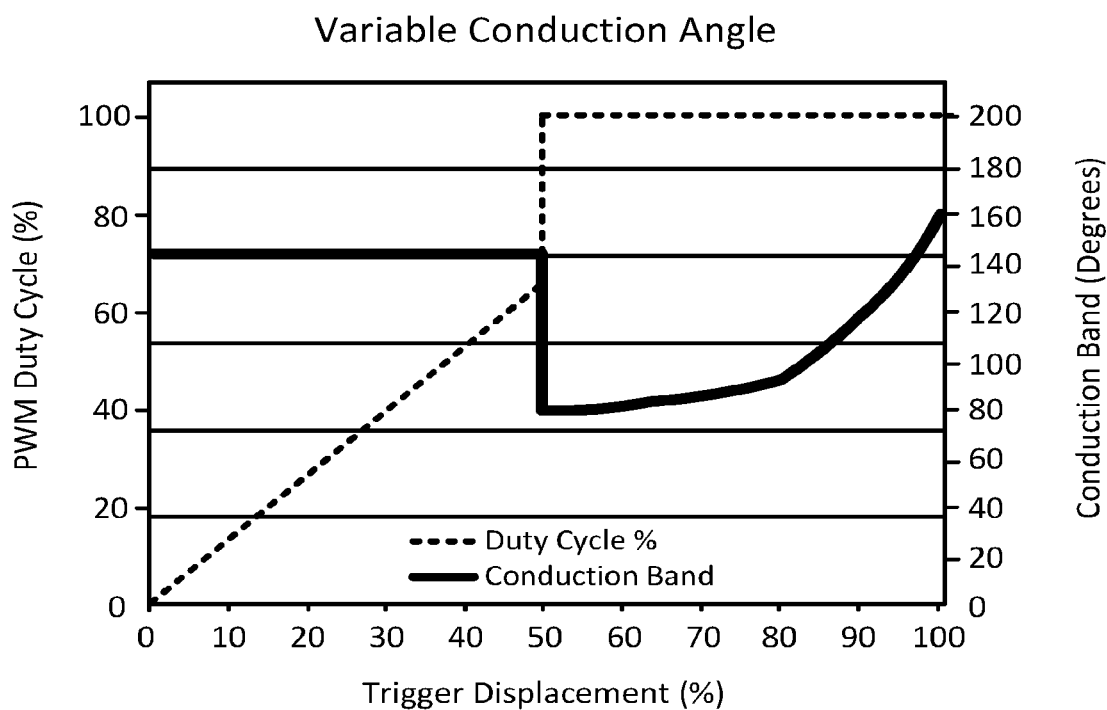
FIG. 8 is a graph depicting a variable conduction angle in relation to PWM duty cycle in an another example embodiment.

Another alternative embodiment is described herein with reference to the speed vs. trigger displacement and conduction band vs. trigger displacement graph of FIG. 8. In this embodiment, the controller sets the PWM duty cycle of the motor to 100% in a first range of trigger displacement which ranges from full trigger displacement to a lower predetermined transition point (e.g., 50% in this example) of trigger displacement. To control motor speed in this first range of trigger displacement, the conduction band (and optionally advance angle) is adjusted. For example, the CB/AA is set at 160/50 at 100% trigger displacement, 120/30 at 75% trigger displacement and 90/20 at 50% trigger displacement. Rather than increasing conduction band for speed control, conduction band is decreased to control speed in the first range of trigger displacement. Although not limited thereto, the change in conduction band (and angle advance) across the first range is nonlinear. The controller may utilize a look-up table or an algorithm to calculate the applicable CB and/or AA value corresponding to the trigger displacement. One advantage of adjusting speed using CB/AA is to decrease switching losses associated with PWM control. Below the predetermined transition point, speed control is performed by adjusting PWM duty cycle. In this second range of trigger displacement, the CB/AA is held constant (e.g., CB/AA=160/50) to simplify control.

Variations in the two open loop control techniques described above are envisioned to meet requirements of particular tool types and applications. It is also once again reiterated that CB/AA levels of 120°/30°, 140°/40°, 160°/50° mentioned in any of these embodiments (as well as the embodiments discussed below) are merely by way of example and any other CB/AA level or combination that result in increased (or decreased) power and/or speed performance in accordance with the teachings of this disclosure are within the scope of this disclosure. While reference is made to PWM control for DC power tools in the embodiment described above, it must be understood that a similar method may be used in variable-speed AC power tools using a brushless motor.

In another aspect of this disclosure, torque pulsations from rotor can cause motor vibrations and gear chatter at light loads. By lowing CB and/or AA during low load conditions, it was discovered that the undesirable noise could be reduced. Lowering the CB and/or AA smooths out the electromagnetic torque which in turn creates a more constant speed and lowers vibrations.

Figure 9:
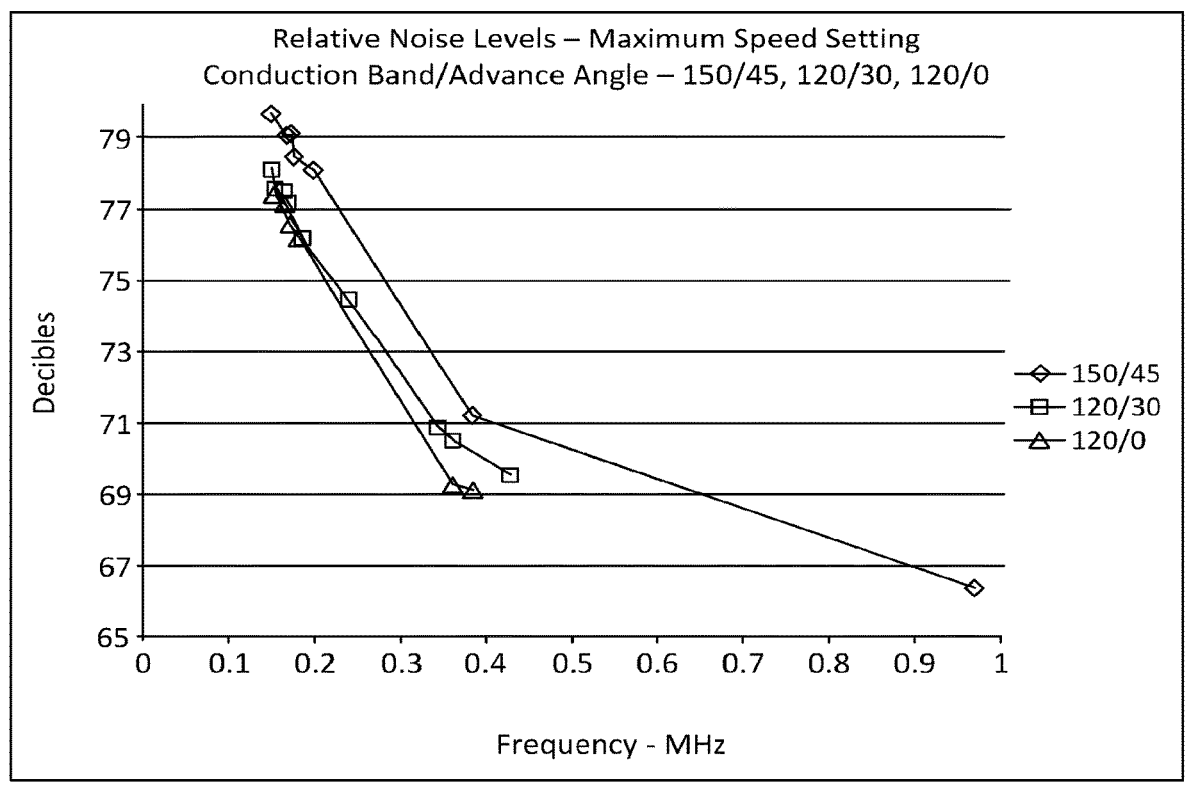
FIG. 9 is a graph depicting noise levels in accordance with different CB/AA settings.

FIG. 9 illustrates the conducted emissions from a given tool in a range of 0.15-1.0 MHz for three different CB/AA settings. Note the reduction in noise level as the conduction band diminishes from 150 degrees to 120 degrees. Note further the reduction in noise level as the advance angle is reduced from 45 degrees to 30 degrees to 0 degrees. This data demonstrates the advantage of lower conduction band/advance angle at no-load conditions. Noise is not a concern during heavy load conditions. Therefore, as load increases, the conduction band and advance angle can be increased to deliver more output power.

Figure 10:
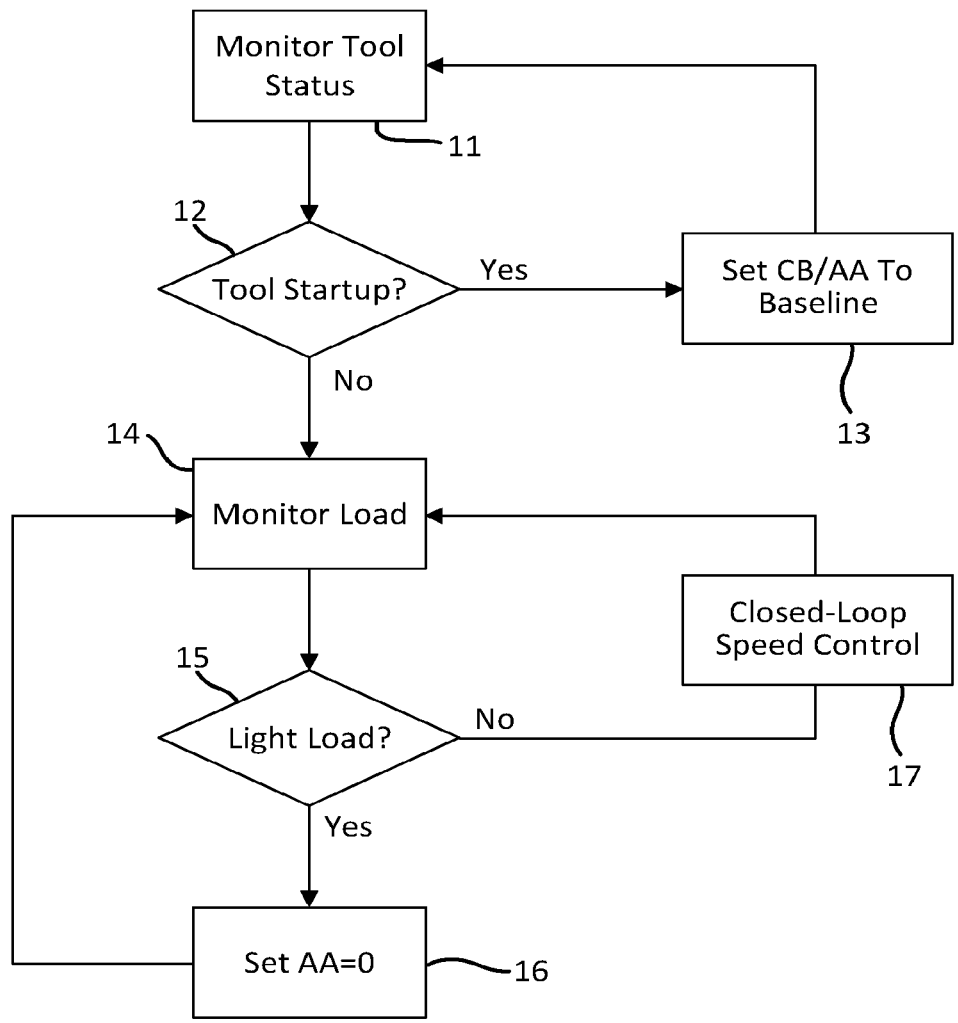
FIG. 10 is a flowchart depicting an example control scheme for reducing noise during light load conditions.

FIG. 10 depicts an example control scheme which may be used to reduce noise at light loads. Tool operation is monitored as indicated at 11. Tool startup can be determined in different ways. For example, tool startup may be defined as a predefined time period after the motor is energized. Alternatively, tool startup may be defined when motor speed is less than a predefined value (e.g., 5,000 rpm). Other techniques for determining tool startup are also contemplated by this disclosure.

At tool startup, the conduction band and the advance angle are preferably set at 13 to baseline values (e.g., CB set to 120 degrees and AA set to 30 degrees). In a tool with a brushless motor, the hall board is typically rotated by 30 degrees which thereby mechanically advances the commutation cycle by 30 degrees although other means for setting the baseline values are also contemplated by this disclosure. Running the tool at startup with an angle advance of 30 degrees helps the controller to commutate the motor more smoothly. The advance angle may be subsequently varied during tool operation by advancing or retarding the angle from this baseline value.

After tool startup, load on the motor (or parameter(s) indicative of the load on the motor) is monitored at 14 and compared to a threshold at 15 by the controller 230. In one embodiment, the controller is configured to monitor a parameter indicative of the load on the motor. For example, the load on the motor may be determined directly by measuring current drawn by the motor. Current may be measured by the controller via a shunt placed in the motor current path. In another example, the load on the motor may be determined by measuring rotational speed of the motor (e.g., via Hall sensors). If the parameter is above a threshold, then a load condition is assumed. For rotational speed, the parameter corresponds to a difference between the measure speed and a target speed. It is understood that the target speed may be a maximum speed in a fixed speed tool or value set according to a speed dial in a variable speed tool. Light load conditions are determined when the load (or the parameter indicative of the load) is below the threshold. Other techniques for determining load conditions are known in the art and may be employed in this control scheme.

During light load conditions, the CB and/or the AA may be lowered to reduce noise. In an example embodiment, the tool is typically operated at a conduction band of 120 and angle advance of 30 degrees. The angle advance is then lowered as indicated at 16 to a value less than the baseline value (e.g., zero) during light load conditions. For power tools with a fixed 30 degrees of angle advance introduced mechanically, zero degrees of net angle advance may be achieved by applying 30 degrees of angle retardation by means of software instructions. That is, the commutation cycle is shifted to the right by 30 degrees. It is envisioned that the conduction band may be adjusted in place of or in combination with the advance angle during light load conditions.

When load increases (e.g., above a threshold), closed loop speed control is implemented as indicated at 17. In some embodiments, closed loop speed control is implemented by monitoring tool output speed or motor speed and adjusting duty cycle of motor control signals to maintain a desired speed as described above. In other embodiments, closed loop speed control is implemented by monitoring tool output speed or motor speed and adjusting CB and/or AA to maintain the desired speed as described above. It is understood that this control scheme may be implemented in conjunction with other control schemes set forth here or elsewhere that adjust CB and/or AA during tool operation.

Conduction band control may also be used to address harmonic content in the AC line current. In brushless power tools driven by an AC source, the harmonic content in the AC line makes it difficult to meet the EU harmonics requirements which are measured at no load. This is particularly true for tools, such as miter saws, that require significant amounts of power in order for them to spin at the desired no load speed.

Figure 11A:
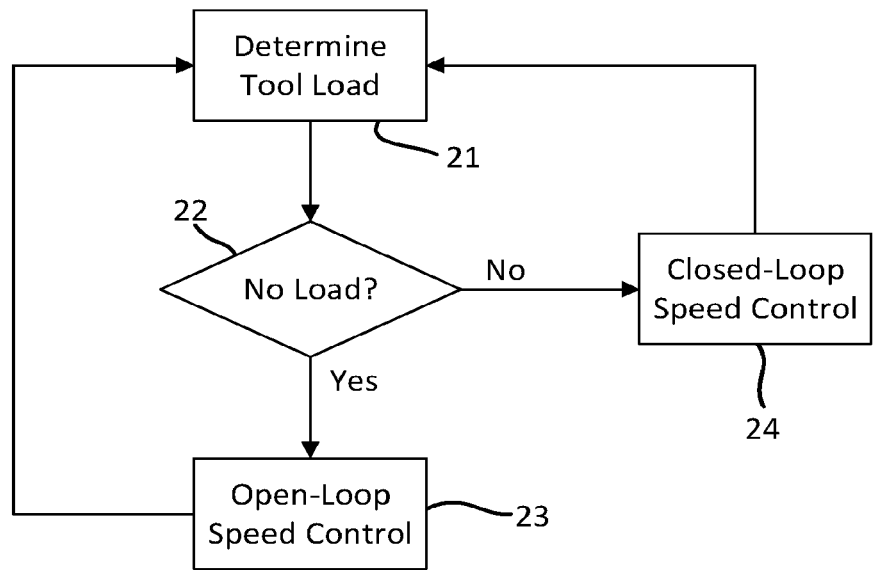
FIG. 11A is a flowchart depicting one example control scheme which may be used to reduce harmonics at no loads.

FIG. 11A depicts an example control scheme which may be used to reduce harmonics at no loads. During tool operation, loads (or parameter(s) indicative of load) are monitored at 21 and compared to a threshold at 22 by the controller 230. Different techniques for determining load conditions are known in the art and may be employed in this control scheme such as those described above.

Closed loop speed control of a power tool is quite effective from a performance perspective; however the harmonic content of the AC line current as well as the low power factor make this implementation problematic. A dramatic improvement can be achieved when going from closed loop to an open loop fixed duty cycle control scheme. In one example embodiment, open loop speed control is implemented during no load conditions as indicated at 23. In an open loop approach, tool output speed or motor speed is not monitored by the controller. Rather, the duty cycle of the motor control signals are set in accordance with the desired fixed speed of the tool or input from an input unit (i.e., speed dial) in a variable speed tool.

Once a load is detected at 22, the tool reverts to closed loop speed control as indicated at 24. Again, closed loop speed control may be implemented by monitoring tool output speed or motor speed and adjusting duty cycle of motor control signals to maintain a desired speed as described above. Alternatively, closed loop speed control may be implemented by monitoring tool output speed or motor speed and adjusting CB and/or AA to maintain the desired speed as described above.

Figure 11B:
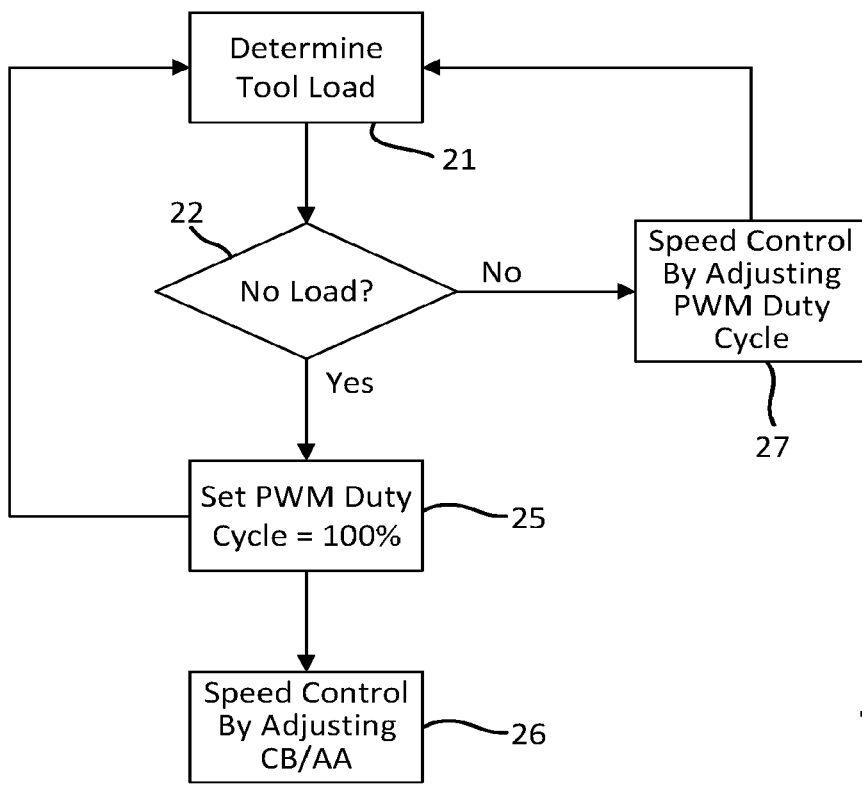
FIG. 11B is a flowchart depicting another example control scheme which may be used to reduce harmonics at no loads.

FIG. 11B depicts an alternate control scheme which may be used to reduce harmonics at no loads. During tool operation, loads (or parameter(s) indicative of load) are monitored at 21 and compared to a threshold at 22 by the controller 230. Different techniques for determining load conditions are known in the art and may be employed in this control scheme such as those described above.

During no load conditions, different steps are taken to lower harmonics. One approach is to use a predetermined "fixed" duty cycle to achieve the desired speed control. In particular, the situation improves when the tool is operating at 100% duty cycle as indicated at 25. In many tools, setting the duty cycle to 100% increases the no load speed above the desired maximum operating speed. That is, the maximum operating speed is typically achieved at a duty cycle less than 100%. Therefore, this approach adjusts the CB and/or AA to achieve the desired speed. For example, the conduction band can be decreased below its normal value (e.g., 120 degrees) to achieve the desired operating speed at no load while maintaining the duty cycle at 100%. In this example, the value of the conduction band remains fixed during the no load condition. In other embodiments, it is envisioned that the fluctuations in the AC input signal may cause the operating speed to vary even during no load conditions. In these embodiments, the tool may employ closed loop speed control which varies the operating speed by adjusting the conduction band (or optionally AA) to achieve a constant speed during no load conditions. It is envisioned that the advance angle may be adjusted in place of or in combination with the conduction band during no load conditions.

Once a load is applied to the tool, speed control is implemented by adjusting the duty cycle of the motor control signals as indicated at 27. In some embodiments, the tool resumes closed loop speed control during a loaded condition. That is, speed control is a function of the difference between a measure speed and a target speed. Speed may be adjusted by varying the PWM duty cycle. It is to be understood that only the relevant steps of the control scheme are discussed in relation to FIGS. 11A and 11B, but that other software-implemented instructions may be needed to implement an overall control scheme for the tool.

Figure 12:
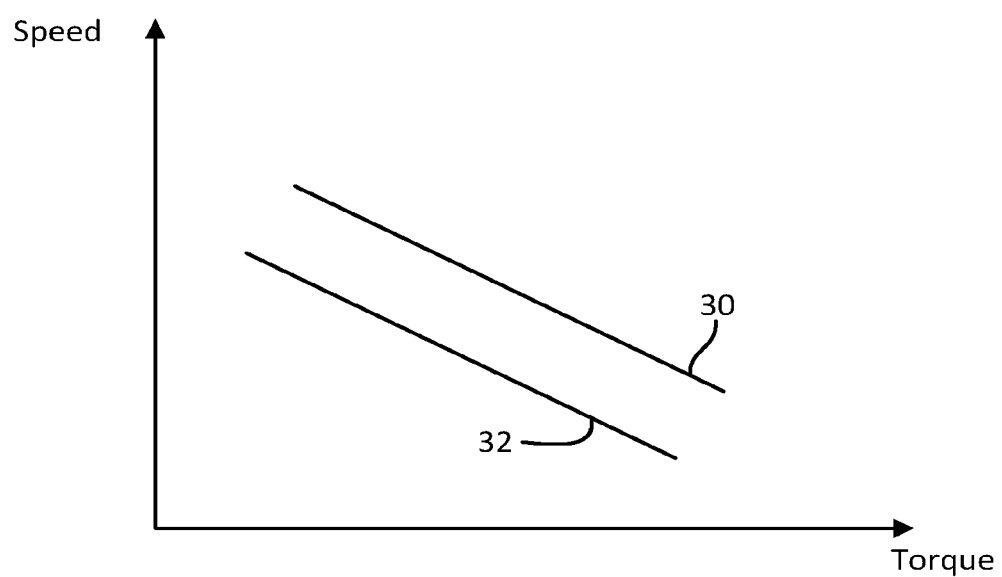
FIG. 12 is diagram depicting the effect of battery drainage on the torque-speed curve of a tool.

Another aspect of the invention is described with reference to FIGS. 12 and 13. In DC power tools using brushless motors powered by a battery (both variable-speed and constant-speed power tools), the motor power output is affected by the battery power. As the battery drains, the motor power output is consequently decreased. The effect of battery drainage is depicted in the torque-speed curve of FIG. 12. In this figure, the torque-speed curve moves from 31 to 32 as the battery drains. What is desired is to boost the speed when the battery level is low to allow the user to maximize the use of the power tool.

Figure 13:
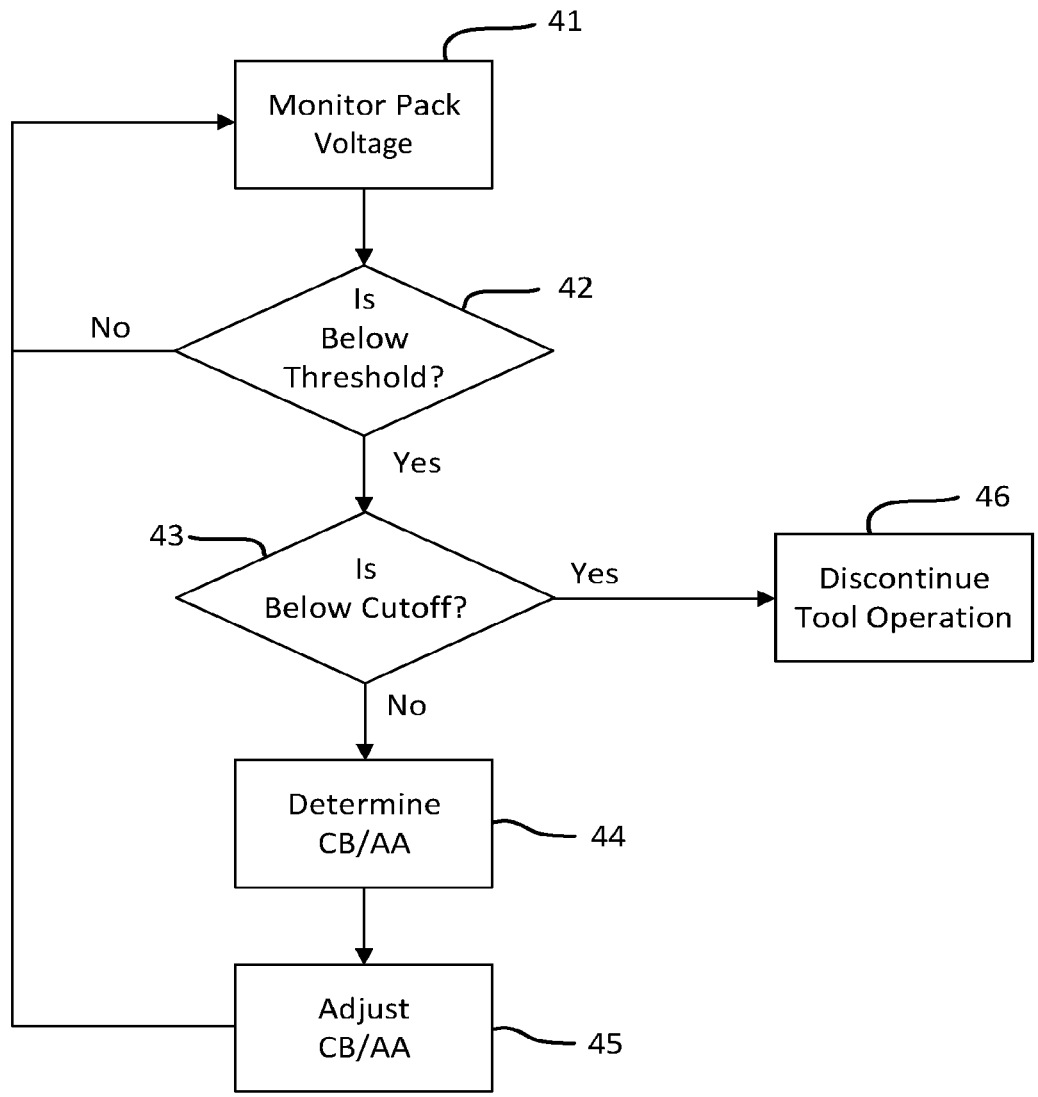
FIG. 13 is a flowchart depicting an example control scheme which may be use to increase tool usage as the battery drains.

FIG. 13 depicts an example control scheme which may be used to increase tool usage as the battery drains. In order to compensate for low voltage of the battery, the battery voltage is monitored at 41 by the controller 230. U.S. Pat. No. 8,274,261 discloses an example arrangement for monitoring battery voltage which may be integrated into the tool and is incorporated in its entirety herein by reference. Other arrangements for monitoring battery voltage are also contemplated by this disclosure.

The battery voltage is then compared at 42 to a certain threshold. Once the battery voltage drops below the certain threshold (e.g. 19 volts), the conduction band (and optionally advance angle) is increased by the controller at 45 in order to increase the amount of voltage provided to the motor. The controller first determines the adjustment amount for the conduction band (an optically the advance angle) as indicated at 44.

In one embodiment, the values for CB and/or AA are retrieved from a look-up table based on the current battery voltage measure. A portion of an example look-up table is as follows.

| Battery voltage (volts) | CB | AA |
|---|---|---|
| 19 | 127 | 34 |
| 18 | 135 | 37 |
| 17 | 142 | 41 |
| 16 | 150 | 45 |

CB and/or AA are then adjusted at 45 in accordance with the retrieved values. It is envisioned that other techniques for determining the adjustment amount fall within the scope of this disclosure.

In the example embodiment, the increase in conduction band continues until the battery voltage drops below a second cut-off threshold. The cut-off threshold may represent an under-voltage condition being detected by the tool. The under-voltage condition may also be detected if the voltage level of an individual battery cell or a sub-set of battery cells fall below a predetermined voltage threshold. Once an under-voltage condition is detected, the supply of power to the motor may be cut-off in order to protect the battery cells from damage as indicated at 46.

It is also noted that all the speed, torque, and power parameters and ranges shown in any of these figures and discussed above are exemplary by nature and are not limiting on the scope of this disclosure. While some power tools may exhibit similar performance characteristics shown in these figures, other tools may have substantially different operational ranges.

Some of the techniques described herein may be implemented by one or more computer programs executed by one or more processors, controllers and/or control units residing, for example on a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool, comprising:
a brushless direct current (BLDC) motor having a stator defining a plurality of phases;
a switching arrangement having a plurality of motor switches connected electrically between a power source and the BLDG motor and operates to deliver power to the BLDG motor; and
a controller interfaced with the plurality of motor switches and, for each phase, operates to output a pulse-width modulated (PWM) signal to one or more of the plurality of motor switches to control power supplied to the BLDG motor, wherein
the controller is configured to:
set an advance angle corresponding to an angle by which commutation of the plurality of phases is advanced to a baseline value,
monitor a parameter associated with load on the BLDG motor,
in a low-load condition where the load is below a load threshold, maintain the advance angle at a value that is approximately 30 degrees smaller than the baseline value to reduce noise, and
upon detection of the load being greater than or equal to the load threshold indicative of a loaded condition, begin to gradually increase the advance angle from the baseline value to an upper threshold value to maintain speed of the BLDG motor at a target speed with increased load.

2. The power tool of claim 1, wherein the controller is configured to measure rotational speed of the BDLC motor and compare the measured rotational speed to a target speed.

3. The power tool of claim 2, wherein the parameter corresponds to a difference between the measured rotational speed and the target speed.

4. The power tool of claim 1, wherein the controller, in response to detecting the low-load condition, sets the value of the advance angle to zero.

5. The power tool of claim 4, wherein the controller, in response to detecting the loaded condition, varies a conduction band associated with the phases of the motor from a baseline conduction band value in tandem with the advance angle.

6. The power tool of claim 1, wherein the controller receives positional signals associated with the motor from a plurality of positional sensors mechanically positioned at an angle with respect to the motor to achieve a mechanical advance angle, and in the low-load condition, the controller electronically retards the conduction band for each phase to in a direction opposite the advance angle to counteract the mechanical advance angle.

7. The power tool of claim 1, wherein the controller is configured to determine tool startup and control power output of the BLDG motor by setting the advance angle to the baseline value during tool startup.

8. The power tool of claim 1, wherein the controller sets a conduction band corresponding to the plurality of phases of the BLDC motor to a predetermined value and, in response to detecting the low-load condition, decreases the conduction band for each phase to a value less than the predetermined value to achieve the target speed while maintaining the duty cycle of the PWM signals at a fixed value.

9. A power tool, comprising:
a brushless direct current (BLDC) motor having a stator defining a plurality of phases;
a switching arrangement having a plurality of motor switches connected electrically between a power source and the BLDC motor and operates to deliver power to the BLDG motor; and
a controller interfaced with the plurality of motor switches and, for each phase, operates to output a pulse-width modulated (PWM) signal to one or more of the plurality of motor switches to control power supplied to the BLDC motor, wherein
the controller is configured to:
monitor a parameter associated with the load on the BLDC motor to determine whether the load is above or below a load threshold,
set a conduction band of the plurality of motor switches within which each one of the plurality of phases of the BLDC motor is powered to a baseline value, if the load is below the load threshold, set an advance angle by which the conduction band for each phase of the BLDG motor is advanced to zero and maintain the advance angle at zero until the load reaches the load threshold, thereby reducing noise during low load condition, and if the load is greater than or equal to the load threshold, set the advance angle to a value greater than equal to approximately 30 degrees.

10. The power tool of claim 9, wherein the controller determines load on the BLDC motor by comparing a measured rotational speed of the BLDC motor with a target speed.

11. The power tool of claim 9, wherein the BLDC motor is configured to operate in three phases and the controller, in response to detecting the load is greater than the load threshold, sets the conduction band to 120 degrees for each phase and the advance angle to 30 degrees for each phase.

12. A power tool, comprising:
a brushless direct current (BLDC) motor having a stator defining a plurality of phases;
a switching arrangement having a plurality of motor switches connected electrically between a power source and the BLDC motor and operates to deliver power to the BLDC motor; and
a controller interfaced with the plurality of motor switches and, for each phase, operates to output a pulse-width modulated (PWM) signal having a duty cycle to one or more of the plurality of motor switches to control power supplied to the BLDC motor, wherein
the controller is configured to:
set a conduction band to a baseline value at start-up, the conduction band corresponding to an angle within each one of the plurality of phases of the BLDC motor is powered;
monitor a parameter associated with load on the BLDC motor to determine whether the load is above or below a load threshold,
in response to detecting that the load is below the load threshold, reduce the conduction band for each phase to a value less than the baseline value according to a target speed of the BLDC motor while maintaining the duty cycle of the PWM signal fixedly at a maximum value to, reduce switching losses associated with pulse-width modulation of the plurality of motor switches and thereby reduce noise in a low-load condition when the load is below the load threshold, and
in response to detecting that the load is at the load threshold Or has exceeded the load threshold, set the conduction band for each phase to the baseline value and begin adjusting the duty cycle of the PWM signal from a value smaller than the maximum value up to the maximum value according to the target speed of the BLDC motor.

13. The power tool of claim 12, wherein the controller determines load on the BLDC motor by comparing a measured rotational speed of the BLDC motor with the target speed.

14. The power tool of claim 13, wherein the parameter corresponds to a difference between the measured rotational speed and the target speed.

15. The power tool of claim 14, wherein the controller determines the low-load condition in response to the difference between the measured rotational speed and the target speed being less than a predetermined value.

16. The power tool of claim 12, wherein the controller is configured to maintain the duty cycle of the PWM signal at 100 percent as long as the load is below the load threshold.

17. The power tool of claim 12, wherein the controller, in response to detecting the low-load condition, adjusts the conduction band for each phase to achieve a constant BLDC motor rotational output speed according to the target speed of the BLDC motor.

18. The power tool of claim 17, wherein the BLDC motor is configured to operate in three phases and the controller, in response to detecting that the load greater than the load threshold, sets the conduction band to 120 degrees for each phase, the controller further setting an advance angle by which each conduction band is advanced to 30 degrees for each phase.

19. The power tool of claim 12, wherein the controller, when the load is greater than the threshold and the duty cycle of the PWM signal has reached the maximum value, begins increasing the conduction band above the baseline value in accordance with the target speed of the BLDC motor.

20. The power tool of claim 12, wherein in response to detecting that the load is greater than or equal to the load threshold, the controller maintains speed of the BDLC motor by additionally adjusting at least one of a conduction band of the plurality of motor switches and an advance angle by which the conduction band is advanced based on the difference between the rotational speed of the BLDC motor and the target speed.

* * * * *